(12) United States Patent
Morrison et al.

(10) Patent No.: US 6,340,986 B1
(45) Date of Patent: Jan. 22, 2002

(54) METHOD AND DEVICE FOR TIME SHIFTING TRANSITIONS IN AN IMAGING DEVICE

(75) Inventors: Robert D. Morrison, Star; Eugene A. Roylance, Boise, both of ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/534,747

(22) Filed: Mar. 24, 2000

(51) Int. Cl.[7] .............................................. B41J 2/435
(52) U.S. Cl. ........................ 347/249; 347/250; 347/235
(58) Field of Search ................................ 347/235, 237, 347/236, 246, 247, 249, 250; 358/474; 368/113, 117; 327/141, 153, 161

(56) References Cited

U.S. PATENT DOCUMENTS

| | | | |
|---|---|---|---|
| 5,438,353 A | 8/1995 | Morrison | 347/250 |
| 5,760,816 A | 6/1998 | Morrison | 347/247 |
| 5,793,709 A | 8/1998 | Carley | 368/113 |
| 5,990,923 A | 11/1999 | Morrison | 347/252 |
| 6,151,056 A | * 11/2000 | Araki | 347/246 |
| 6,154,292 A | * 11/2000 | Motoi | 358/474 |

* cited by examiner

*Primary Examiner*—Hai C. Pham
(74) *Attorney, Agent, or Firm*—Gregg W. Wisdom

(57) ABSTRACT

An electrophotographic imaging device uses a transition placement device to position transitions in a stream of video data. A rasterizer included in the electrophotographic imaging device generates pixel data bytes based upon data received from a computer defining an image. A converter generates codes specifying positions of transitions within a pixel time period corresponding to a pixel data byte. The transition placement device includes a phase measuring device to measure a timing offset between an active edge of a beam detect signal and a rising edge of a reference clock. A transition adjustment device adjusts the positions of the transitions specified by the codes relative to the rising edge of the reference clock using the timing offset. Transition generation logic generates the transitions for the stream of video data using the adjusted transition positions received from the transition adjustment device. If the adjusted positions of the transitions shift the occurrence of the transitions to the next cycle of the reference clock, the transition adjustment device determines the position of the transitions relative to the rising edge of the reference clock into which the transitions were shifted. Registers included in a next cycle transition storage device delay the transitions shifted to the next cycle by one reference clock cycle before application to the transition generation logic.

28 Claims, 15 Drawing Sheets

METHOD AND DEVICE FOR TIME SHIFTING TRANSITIONS IN AN IMAGING DEVICE

FIELD OF THE INVENTION

This invention relates to imaging devices. More particularly, this invention relates to the placement of transitions in a data stream in an imaging device.

BACKGROUND OF THE INVENTION

In an imaging device, such as an electrophotographic printer, copier, or fax machine, that uses a scanning device to expose a photoconductor, imaging data is used to control the application of current to a laser diode to form a latent electrostatic image on the surface of the photoconductor. The laser diode generates a beam that is swept across the surface of the photoconductor by the scanning device. The generation of high quality images can be accomplished by precisely controlling exposure of the photoconductor. The image is quantized into pixels that have a dimension in the direction the beam moves across the surface of the photoconductor. An improvement in image quality can be accomplished by decreasing the minimum quantization size of the area developed onto the photoconductor for the dimension of the developed area in the direction the beam is swept across the surface of the photoconductor. In addition to decreasing the minimum quantization size of the area developed, improved image quality is also accomplished by precisely controlling the positioning of the developed area with respect to the direction the beam is swept across the surface of the photoconductor. Decreasing the minimum quantization size can be accomplished by decreasing the minimum time period that the laser diode can be turned on during a sweep across the surface of the photoconductor. A need exists for a method and apparatus that will permit a decrease in the minimum laser on time period while precisely positioning the corresponding developed area on the surface of the photoconductor.

SUMMARY OF THE INVENTION

Accordingly, a method for generating a first transition of a first signal, used to control a light source in an imaging device, within a first time interval has been developed. The method includes determining a second time interval beginning with a second transition of a second signal and ending with detecting a third signal changing out of a first state. The method further includes shifting a predetermined position in time of the first transition with respect to a third transition of the second signal by the second time interval to determine a position in time of the first transition. In addition, the method includes generating the first transition of the first signal at the position.

In an electrophotographic imaging device, a transition placement device to generate a first transition of a first signal, used to control a light source, in a first time interval using a first value, includes a phase measuring device configured to determine a second value using a second time interval beginning with a second transition of a second signal and ending with detection of a change of a third signal out of a first state. The transition placement device further includes a transition adjustment device configured to determine a third value, representing a position in time of the first transition relative to a third transition of the second signal, using the first value and the second value. In addition, the transition placement device includes a transition generation logic configured to generate the first transition at the position using the third value.

An electrophotographic imaging device for forming an image using data includes a photoconductor and a rasterizer configured to generate pixel data corresponding to a pixel time period using the data. The electrophotographic imaging device further includes a circuit configured to generate a position in time of a first transition of a video data signal relative to a second transition of a reference clock using the pixel data. In addition, the electrophotographic imaging device includes a transition placement device. The transition placement device includes a phase measuring device configured to determine a first time interval between a third transition of the reference clock and a state change of a beam detect signal. Additionally, the transition placement device includes a transition adjustment device configured to generate an adjusted position in time relative to the second transition of the reference clock using the first time interval and the position. The transition placement device also includes transition generation logic configured to generate the first transition in the pixel time period using the adjusted transition position. The electrophotographic imaging device further includes a photoconductor exposure system configured to expose the photoconductor to light according to the first transition.

In an imaging device, a method for adjusting a position in time of a transition of a signal relative to a reference clock includes measuring a first time interval between a first rising edge of the reference clock and a change in state of a phase reference signal. The method further includes shifting the position of the transition relative to a second rising edge of the reference clock by the first time interval forming an adjusted position in time. Additionally, the method includes generating the transition at the adjusted position.

DESCRIPTION OF THE DRAWINGS

A more thorough understanding of embodiments of the transition placement device may be had from the consideration of the following detailed description taken in conjunction with the accompanying drawings in which:

Shown in FIG. 1 is a block diagram representation of an embodiment of an electrophotographic imaging device including an embodiment of a transition placement device and an embodiment of a photoconductor exposure system.

Figure 2:
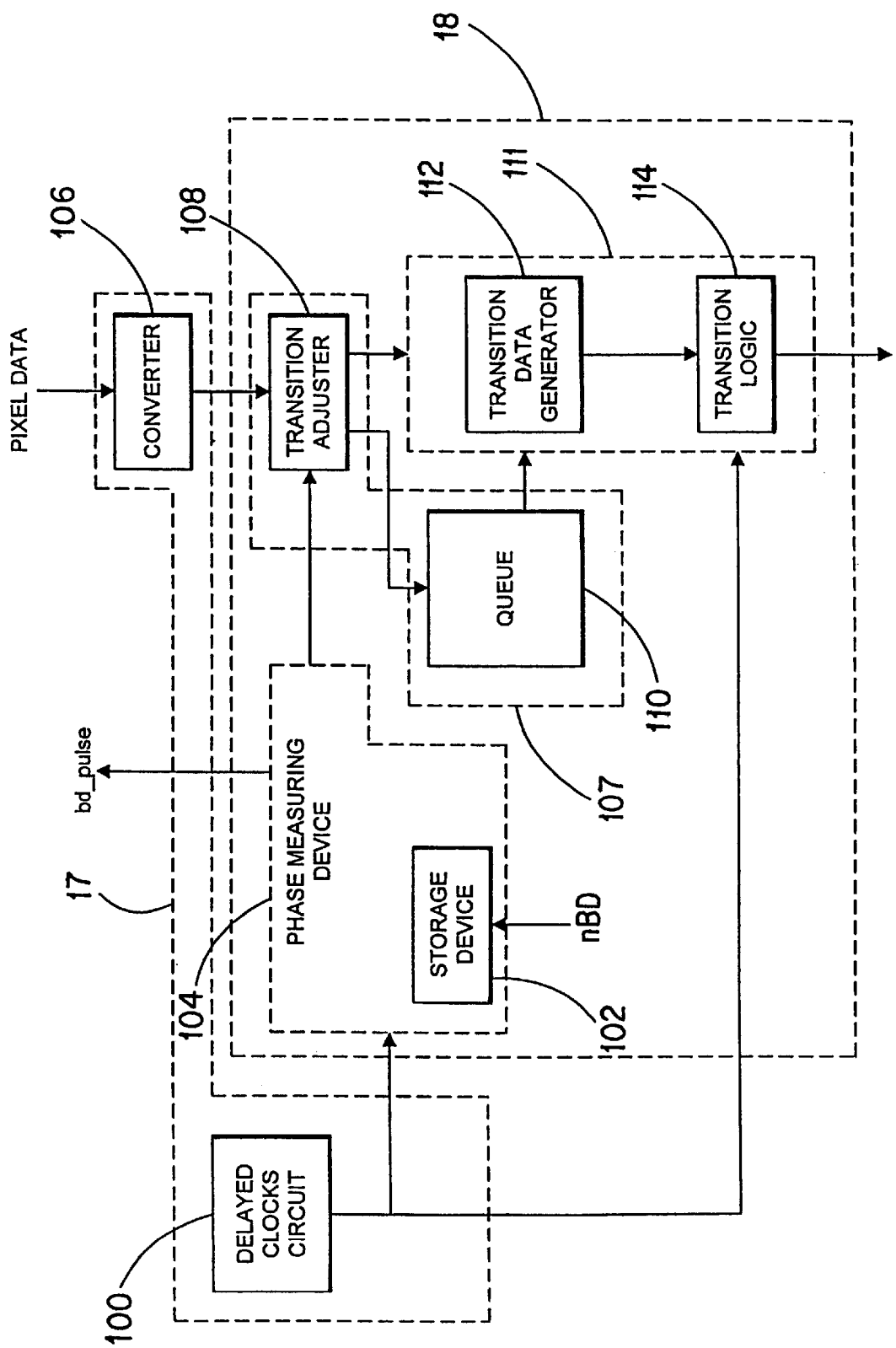

Shown in FIG. 2 is a simplified block diagram of the transition placement device.

Figure 3:
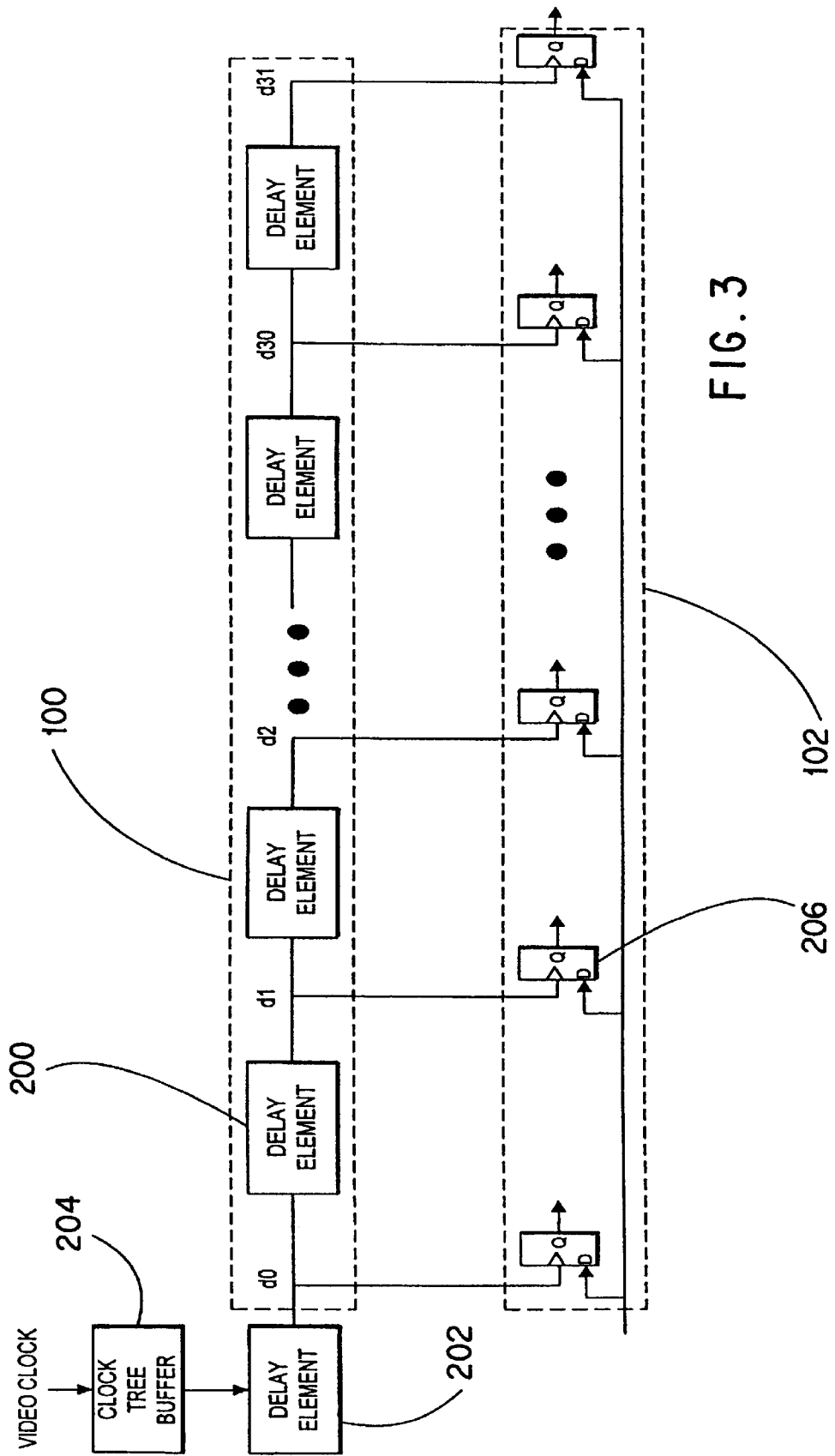

Shown in FIG. 3 is an embodiment of a delayed clocks generator circuit.

Figure 4:
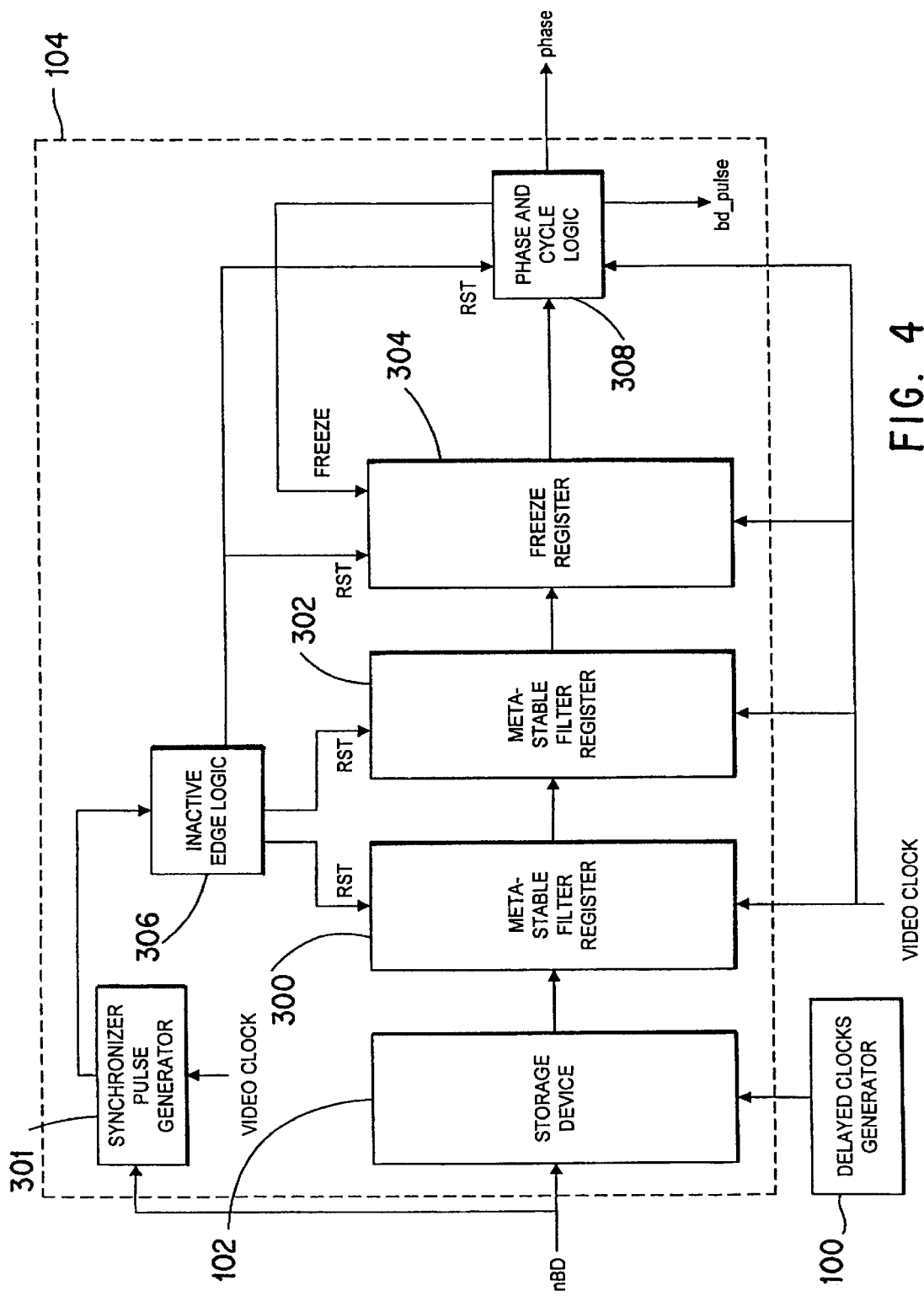

Shown in FIG. 4 is a simplified block diagram of an embodiment of a phase measuring device.

Figure 4A:
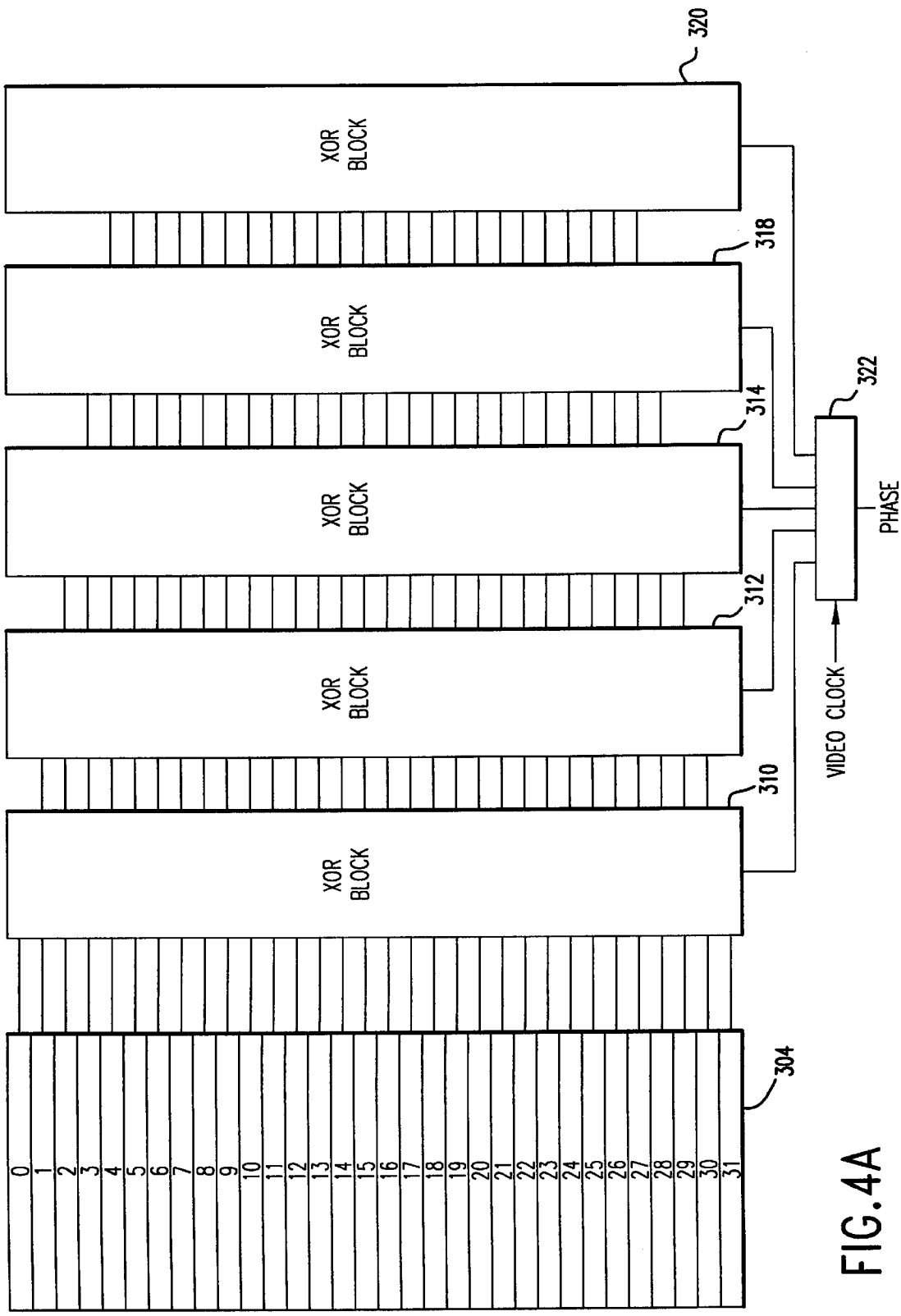

Shown in FIG. 4A is a simplified block diagram of hardware used in the phase measuring device to generate the phase difference value.

Figure 5:
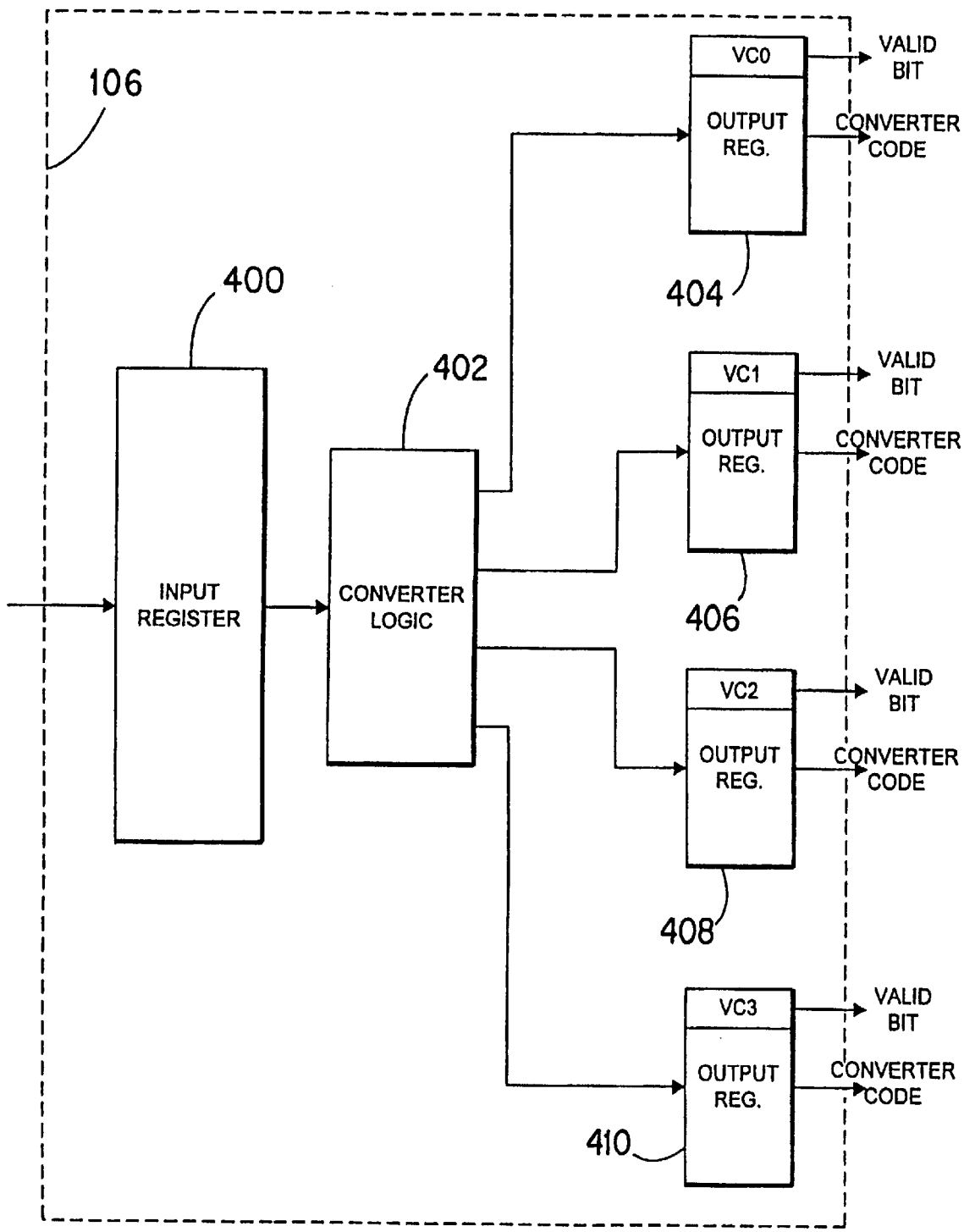

Shown in FIG. 5 is a simplified functional block diagram of an embodiment of a converter to generate codes specifying transition positions from a pixel data byte.

Figure 6:
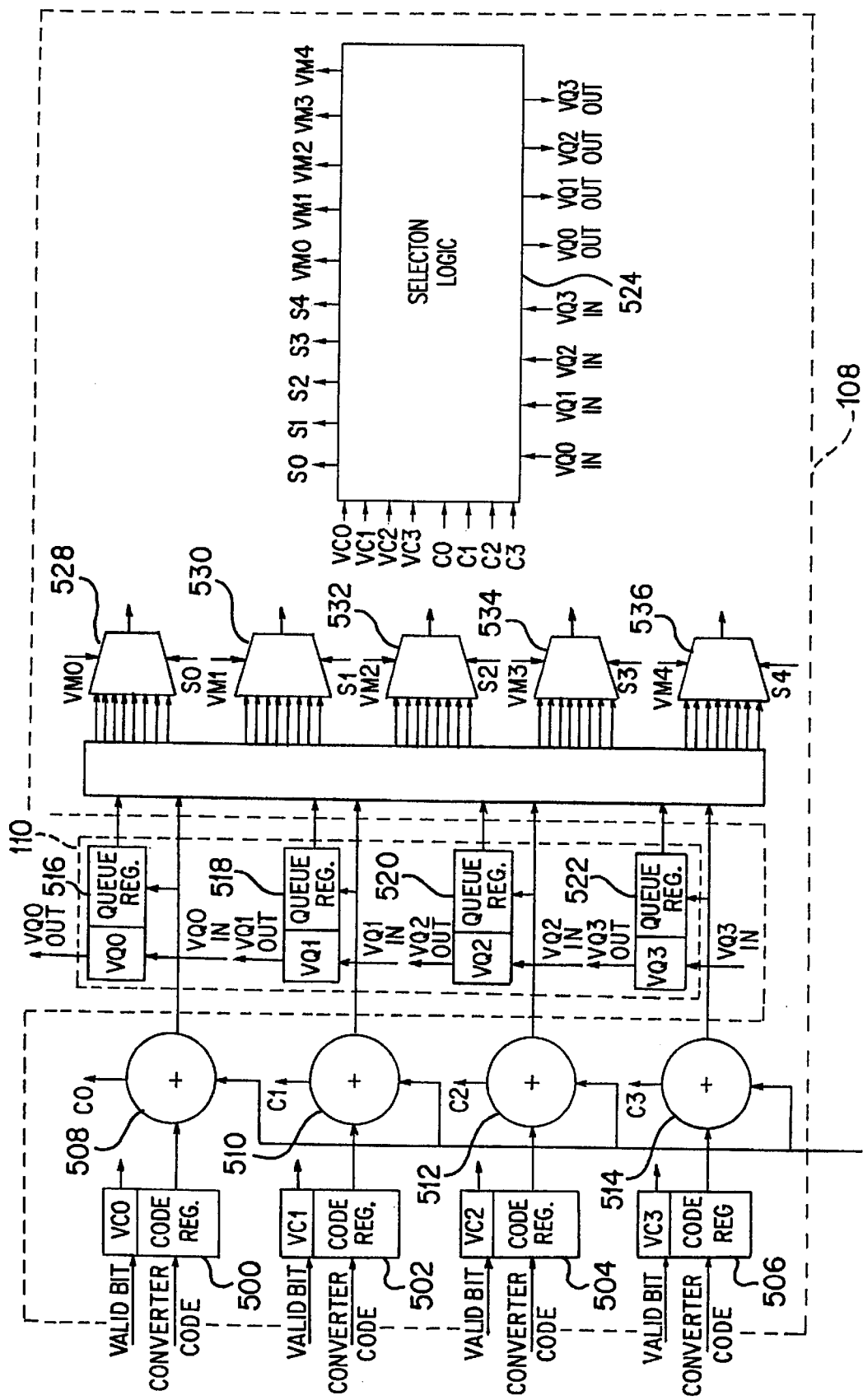

Shown in FIG. 6 is a simplified functional block diagram of an embodiment of a transition adjuster to shift the transition positions specified by the codes from the converter based upon a timing offset between a transition of a beam detect signal and a rising edge of a reference clock.

Figure 7:
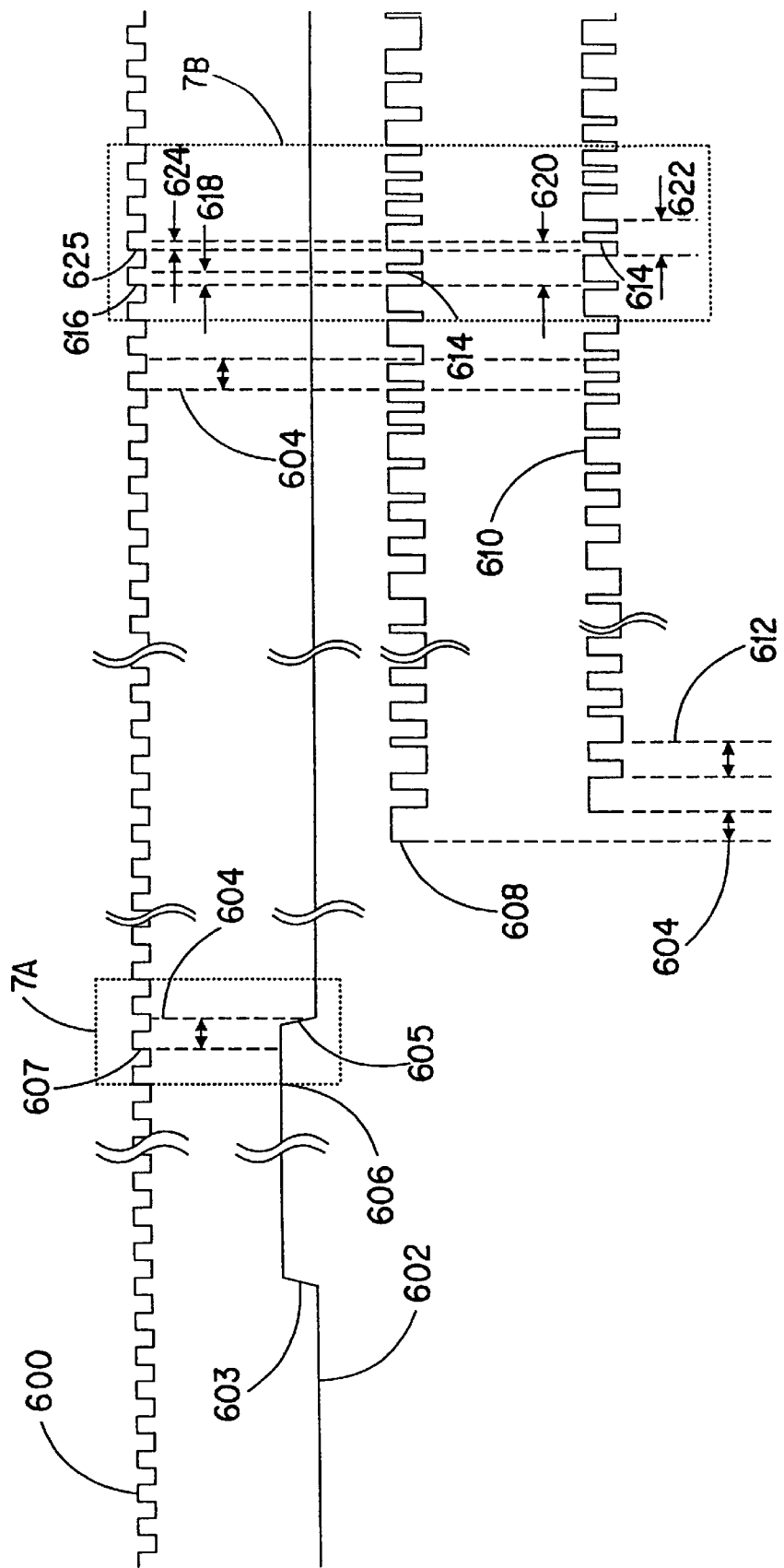

Shown in FIG. 7 is a timing diagram showing the timing relationship between a reference clock, an nBD signal, and a video data stream.

Figure 7A:
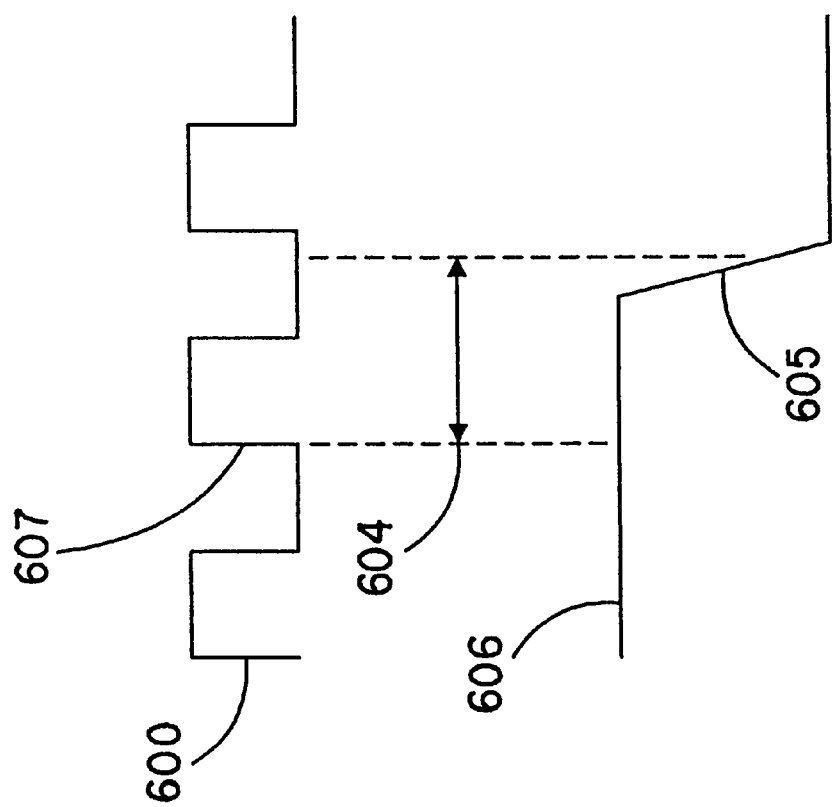
Figure 7B:
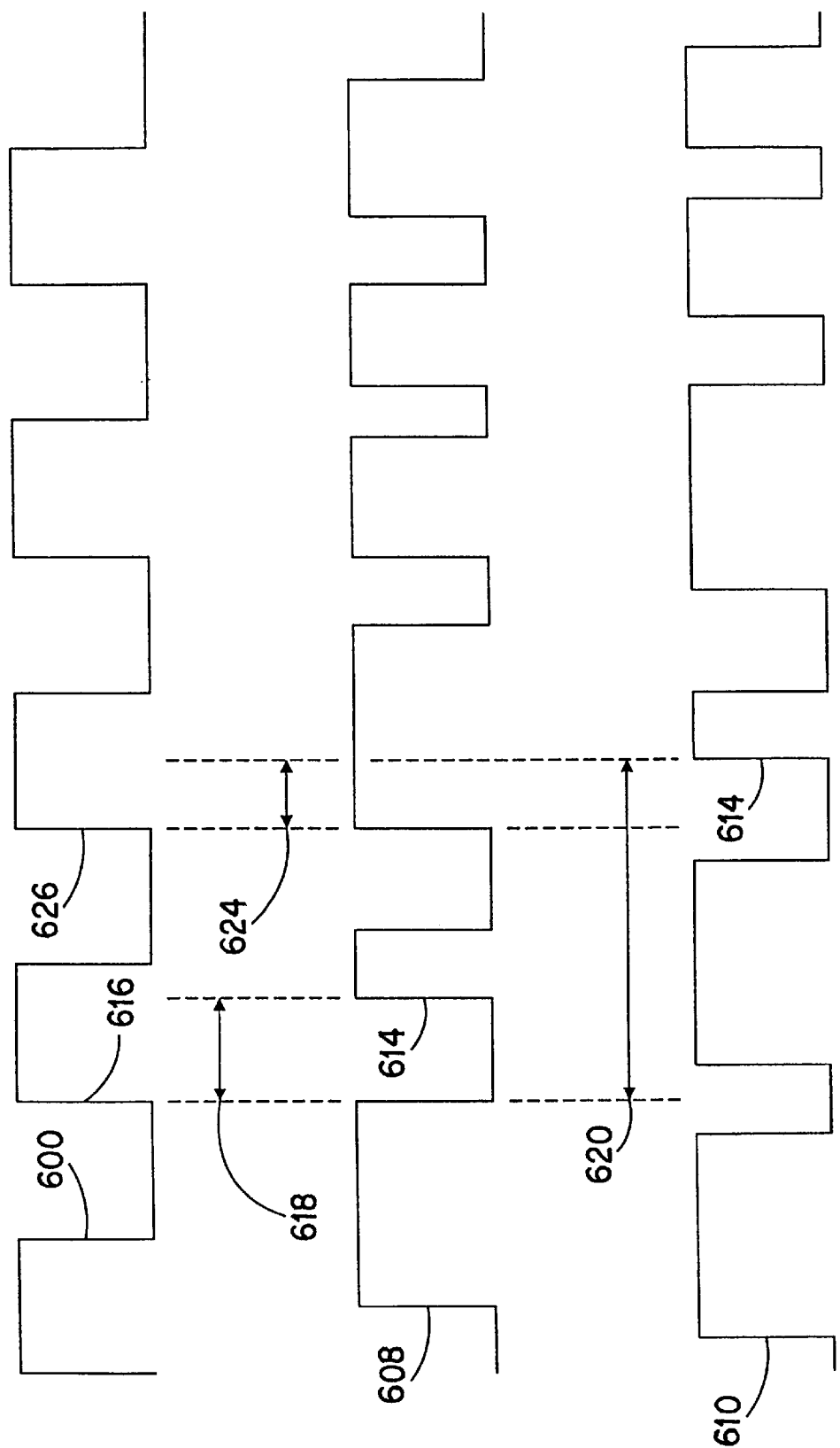

Shown in FIGS. 7A and 7B are detail timing diagrams of corresponding regions of FIG. 7.

Figure 8:
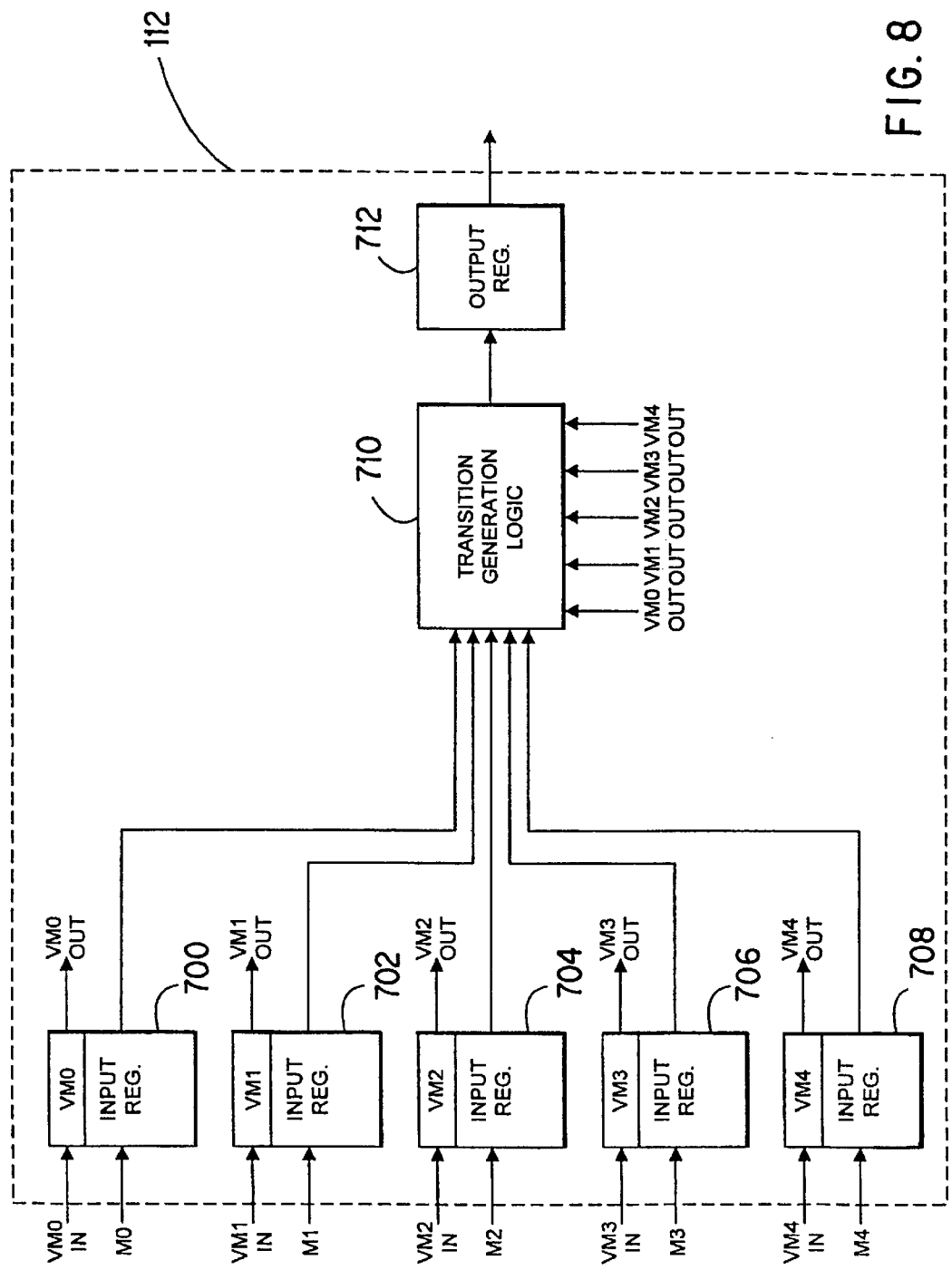

Shown in FIG. 8 is a simplified block diagram of an embodiment of a transition data generator.

Figure 9:
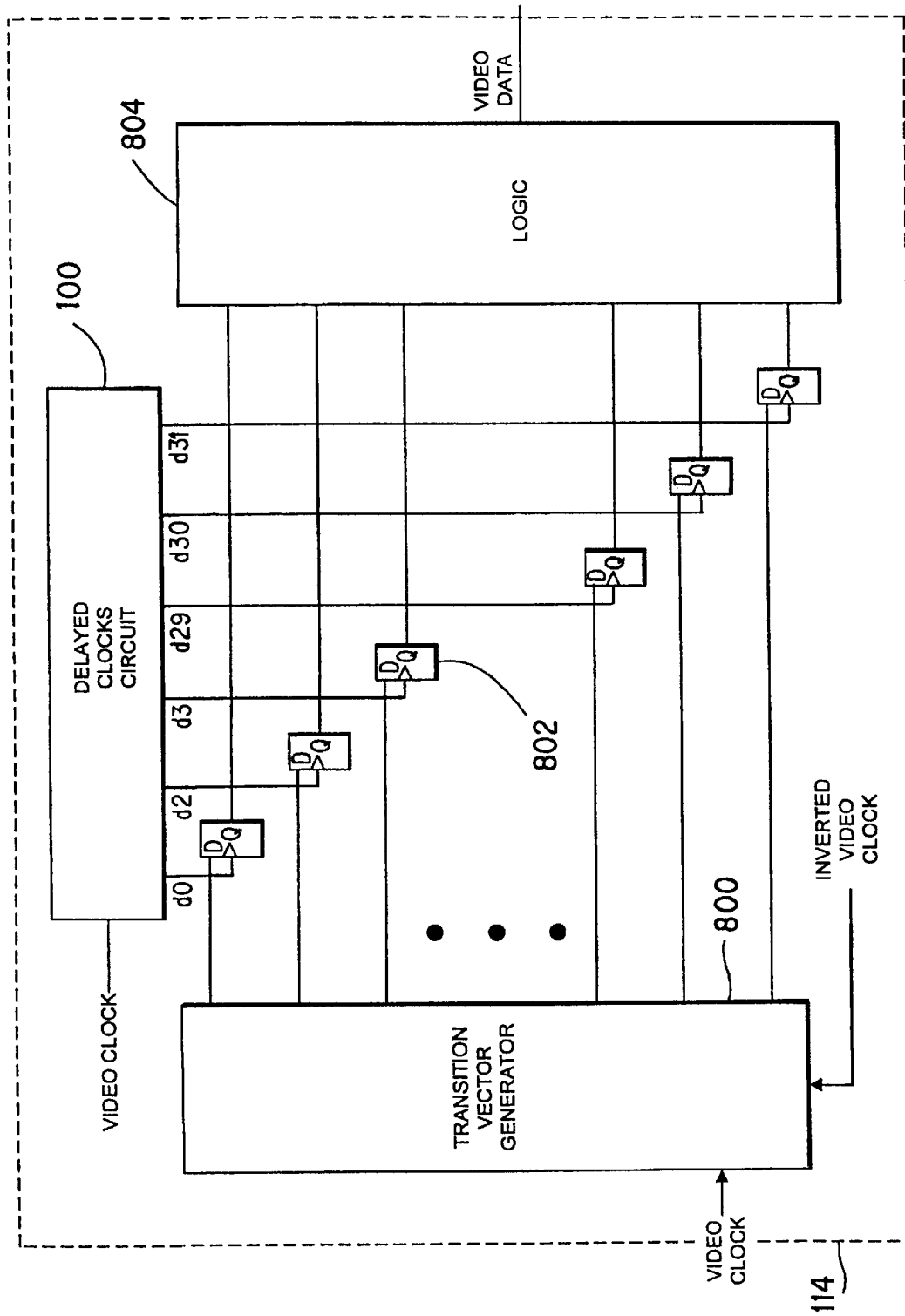

Shown in FIG. 9 is a simplified block diagram of an embodiment of transition logic.

Figure 10:
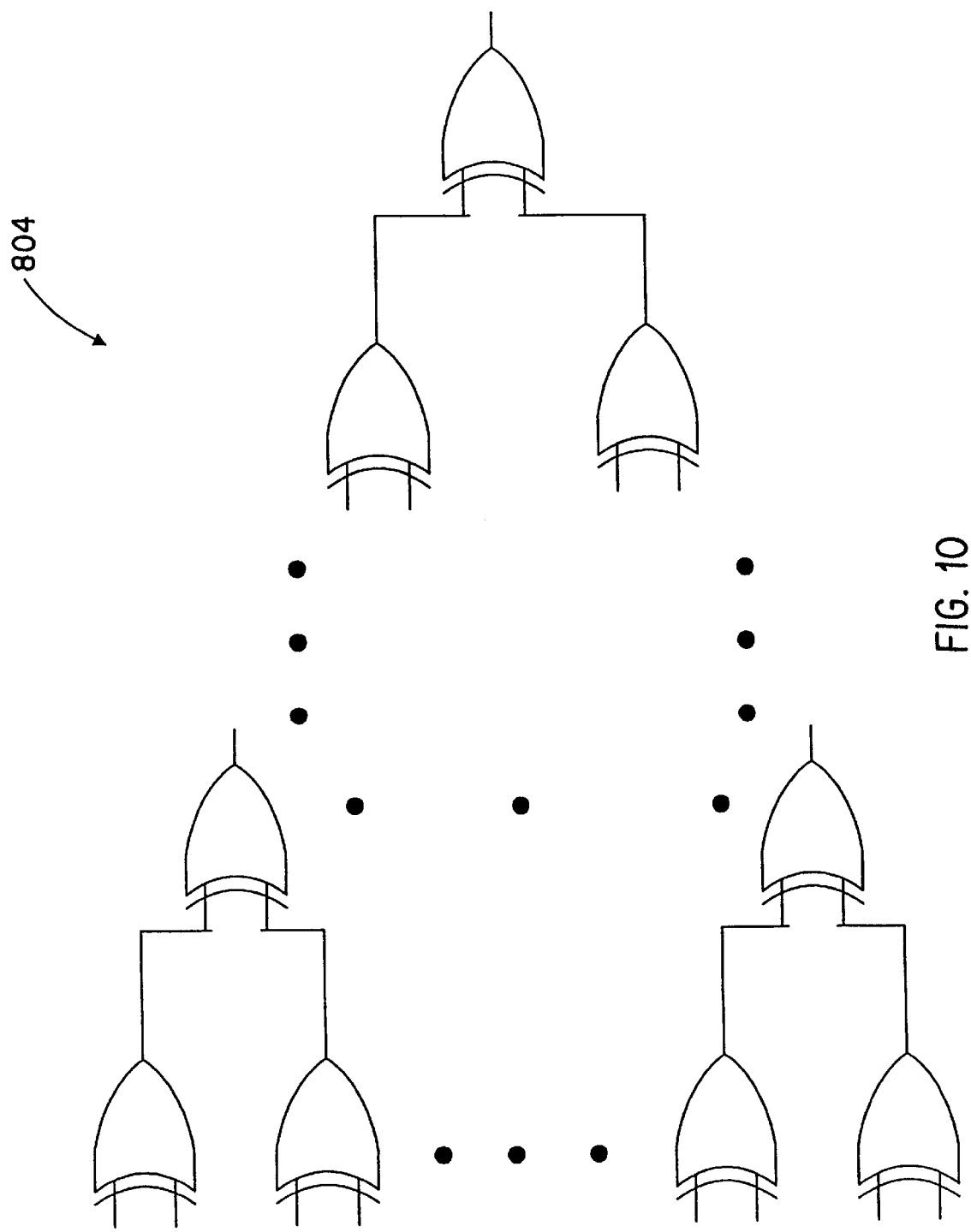

Shown in FIG. 10 is simplified block diagram of logic used to generate a transition.

Figure 11:
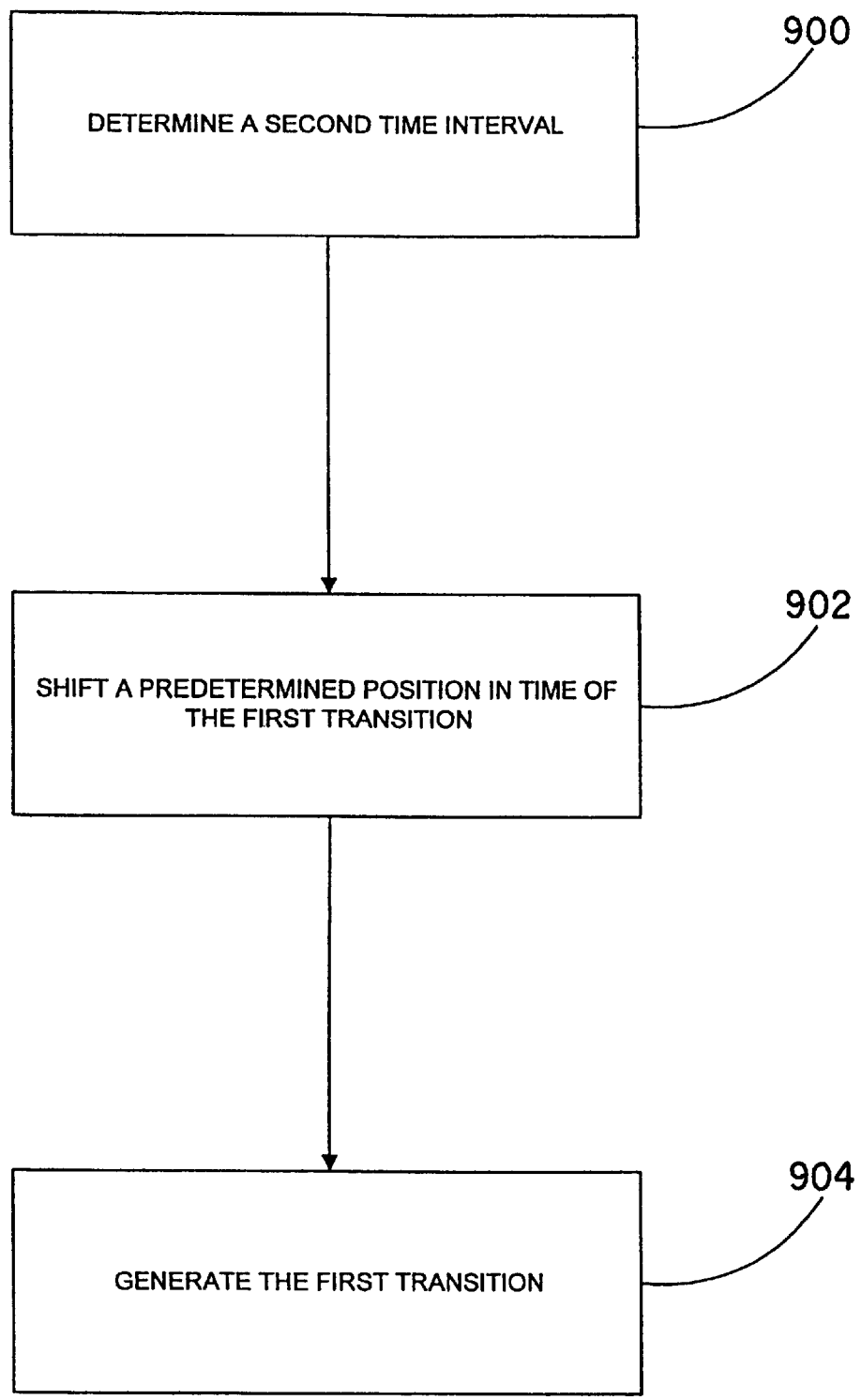

Shown in FIG. 11 is a high level flow diagram of a method for generating a first transition.

Figure 12:
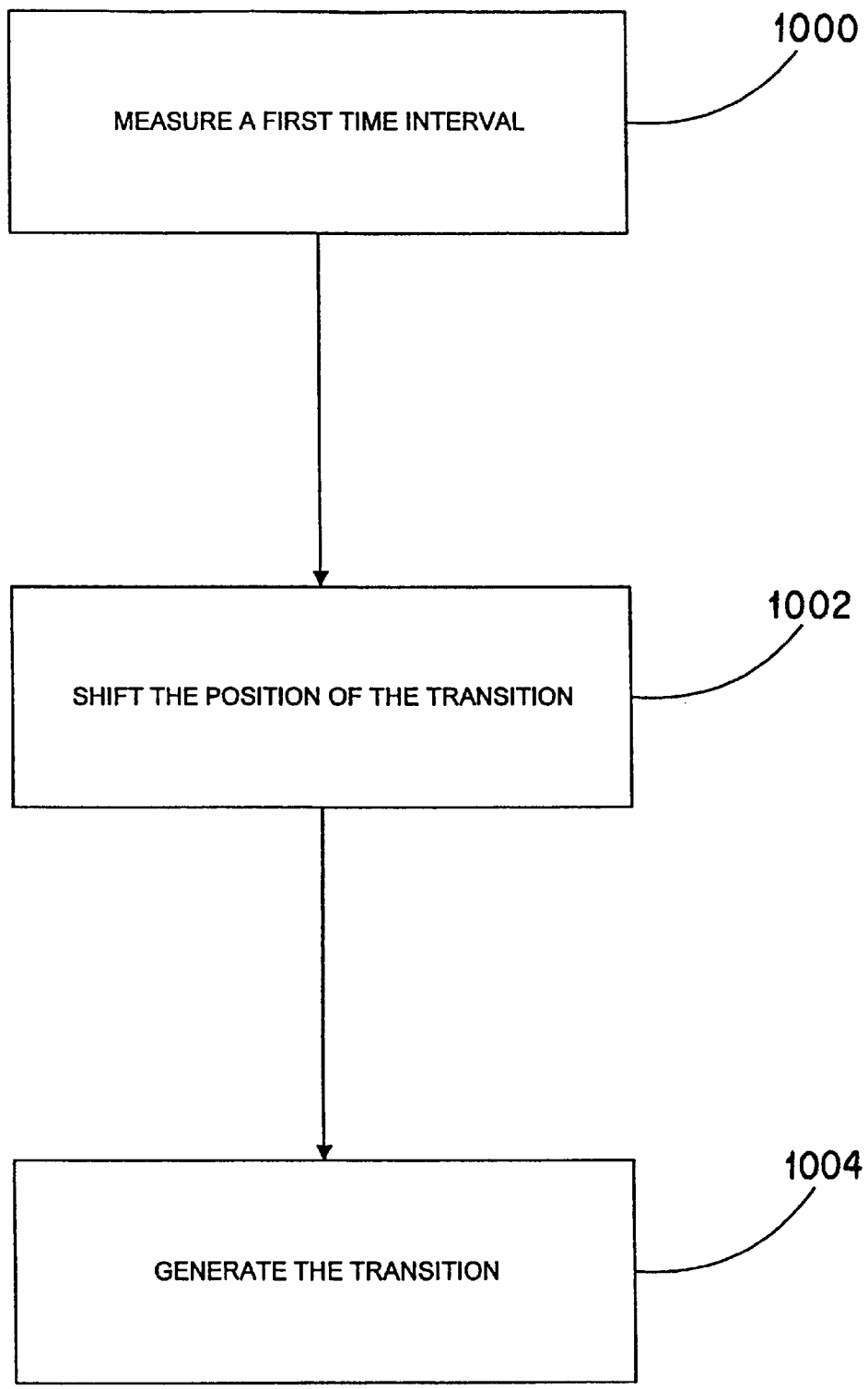

Shown in FIG. 12 is a high level flow diagram of a method for adjusting a position in time of a transition.

DETAILED DESCRIPTION OF THE DRAWINGS

The transition placement device is not limited to the exemplary embodiments disclosed in this specification. Although an embodiment of the transition placement device will be discussed in the context of an electrophotographic imaging device (color or monochrome), such as an electrophotographic printer, it should be recognized that embodiments of the transition placement device have application in devices and systems that can benefit from having the capability to provide pulses of precisely defined length at precisely defined times. Some additional examples of these types of devices and systems include electrophotographic imaging devices such as copiers, and fax machines, or an imaging device such as an inkjet printer.

Figure 1:
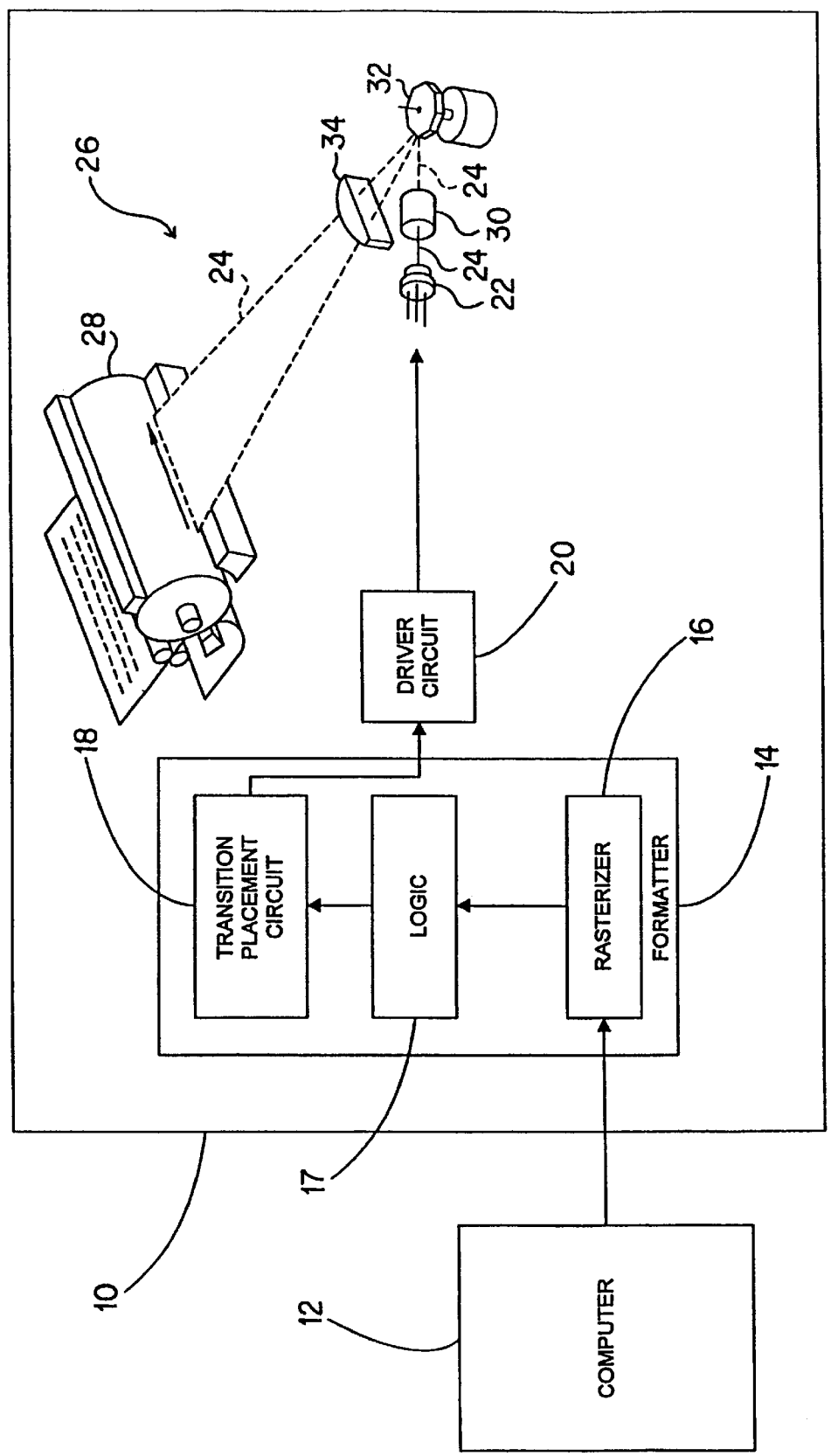

Shown in FIG. 1 is a simplified block diagram of an embodiment of an electrophotographic imaging device, such as electrophotographic printer 10, including an embodiment of the transition placement device. Electrophotographic printer 10 forms an image on media. Computer 12 provides data, including print data, to a formatter 14 included in electrophotographic printer 10. Formatter 14 includes a rasterizer 16 that converts the print data into data used to form the image on the media. Rasterizer 16 may include dedicated hardware for generating the data or it may include a processor executing firmware to generate the data. Logic 17 includes miscellaneous hardware, such as an embodiment of a delayed clocks generator and an embodiment of a converter, to generate signals and data used by an embodiment of a transition placement device, transition placement circuit 18. Transition placement circuit 18 receives the data from logic 17 and generates a stream of video data that is supplied to driver circuit 20. Driver circuit 20 receives the video data from transition placement circuit 18 and controls the flow of drive current through a light source, such as laser diode 22. In response to the drive current, laser diode 22 generates a pulsating beam 24, with the time period of the pulses of the beam corresponding to the time period of the pulses of the video data. An embodiment of a photoconductor exposure system, such as photoconductor exposure system 26, controls the movement of pulsating beam 24 from laser diode 22 across the surface of a photoconductor, such as photoconductor drum 28. Pulsating beam 24 passes through collimating lens 30, is reflected from rotating scanning mirror 32, and passes through flat focusing lens 34 before impinging upon photoconductor drum 28. Pulsating beam 24 exposes regions on the surface of photoconductor drum 28 that have a dimension (in the direction 36 pulsating beam 24 moves across the surface of photoconductor drum 28) corresponding to time periods of the pulses of the video data.

The operation of the electrophotographic imaging process makes use of other elements not shown in FIG. 1. Because these other elements are not essential to a description of the embodiments of the transition placement circuit, they have been omitted from FIG. 1. These other elements assist in the formation of a latent electrostatic image on the surface of photoconductor drum 28, the development of toner onto that latent electrostatic image, the transfer of toner onto the media, and the fixing of the toner to the media.

Shown in FIG. 2 is a simplified block diagram of logic 17 and transition placement circuit 18. Included in logic 17 is an embodiment of a delayed clocks generator, such as delayed clocks circuit 100. Delayed clocks circuit 100 generates a reference clock signal and delayed versions of the reference clock used to sample the nBD signal. The reference clock is generated using a video clock signal. Included in transition placement circuit 18 is an embodiment of a storage device, storage device 102. Storage device 102 includes storage elements used to store samples of the nBD signal provided to storage device 102. The nBD signal is an inverted version of a beam detect signal (BD signal). The beam detect signal is generated prior to the sweep of pulsating beam 24 across the surface of photoconductor drum 28. The nBD is normally at a low logic level and transitions, briefly, to a high logic level when pulsating beam 24 illuminates an optical sensor included in photoconductor exposure system 26. The falling edge of the nBD signal (referred to as the active edge) is used as a timing reference to synchronize the video data supplied to driver circuit 20 with the start of the sweep of pulsating beam 24 across the surface of photoconductor drum 28. The rising edge of the nBD signal (referred to as the inactive edge) is used to initialize parts of transition placement device 18.

Logic 17 also includes converter 106. Data received from rasterizer 16 by converter 106 includes information specifying the number of transitions within a reference clock period and the location of these transitions within the reference clock period with respect to the beginning of the reference clock period. Converter 106 receives the data from rasterizer 16. The output of converter 106 includes binary encoded values. These values specify the desired locations of transitions within the reference clock period. The desired locations of the transitions are specified by numbers designating those outputs of delayed clocks circuit 100 having delays (with respect to the rising edge of the reference clock) corresponding to desired locations of the transitions within the reference clock period.

One reference clock period substantially equals the time in which pulsating beam 24 is swept across a dimension of an area on photoconductor drum 28 in the direction of movement of pulsating beam 24 across photoconductor drum 28. This dimension corresponds to a width of a pixel. This dimension of the pixel will be referred to as a "pixel width". The time period during which pulsating beam 24 sweeps a distance substantially equal to the pixel width will be referred to as a "pixel time period" and it corresponds in length (although most likely it does not have the correct phase) to a single period of the reference clock. The data supplied by rasterizer 16 to transition placement circuit 18 specifying the locations of transitions (if any) during the pixel time period will be referred to as pixel data.

It is important to recognize that the frequency of reference clock may be a multiple of the frequency of the video clock or it may be a fraction of the frequency of the video clock, depending upon the resolution at which the imaging operation is performed. For example, a time period of the video clock may correspond to a resolution of 1200 pixels per inch but the imaging operation is performed at a resolution of 2400 pixels per inch so that the frequency of the reference clock is twice the frequency of the video clock. Therefore, the frequency of the reference clock does not have to be fixed at the frequency of the video clock.

The reference clock is typically generated on an ASIC in close physical proximity to transition placement circuit 18

(also included in the ASIC) in which it is used. The video clock can be generated off the ASIC and delivered to a input pad on the ASIC. For the case in which the reference clock is a multiple of the video clock, generating the reference clock in close proximity to the physical location at which it is needed helps to reduce radiated frequency interference that would have been generated had the higher frequency reference clock been routed around formatter 14.

A scan line is formed from a line of contiguous pixels across the surface of photoconductor drum 28 corresponding to a sweep of pulsating beam 24 across the surface of photoconductor drum 28. A left edge of a pixel corresponds to the edge of the pixel width first encountered as pulsating beam 24 sweeps across photoconductor drum 28. A right edge of a pixel corresponds to the edge of the pixel width last encountered as the pulsating beam 24 sweeps across photoconductor drum 28.

Photoconductor drum 28 rotates in a direction that is substantially perpendicular to the direction pulsating beam 24 is swept across photoconductor drum 28. High levels of image quality are achieved by controlling the timing of the video data stream supplied to driver circuit 20 with respect to the nBD signal. Controlling the timing of the video data stream with respect to the nBD signal permits precise alignment of pixels, in the direction of rotation of photoconductor drum 28, for successive scan lines across the width of photoconductor drum 28. To reproduce fine image detail, areas within pixels on photoconductor drum 28 less than a single pixel width are exposed and developed. By achieving precise alignment of corresponding pixels on successive scan lines displaced from each other in the direction of rotation of photoconductor drum 28, fine image detail can be accurately reproduced on the media. Without a high level of precision in the alignment of corresponding pixels on successive scan lines, the fine detail of an image will not be well resolved.

Delayed clocks circuit 100 includes a delay chain having a plurality of outputs. The outputs of delayed clocks circuit 100 include the reference clock and successively delayed versions of the reference clock. The cumulative delay between corresponding instances on the reference clock and the most delayed version of the reference clock substantially equals one period of the reference clock. The outputs of delayed clocks circuit 100 are coupled to storage device 102. Storage device 102 uses the outputs of delayed clocks circuit 100 as timing references to sample the nBD signal at the successive increments of time (including a sample corresponding to the reference clock) between successive outputs of delayed clocks circuit 100. Storage device 102 includes a number of outputs equal to the number of samples taken of the nBD signal. Storage device 102 continuously samples the nBD signal synchronously with respect to outputs provided by delayed clocks circuit 100. For example, on the rising edge of the reference clock and delayed versions of the reference clock, storage device 102 samples the nBD signal. The resulting samples represent the value of the nBD signal at successive instances in time separated by an amount of time corresponding to the delays in time between outputs of delayed clocks circuit 100. The outputs of storage device 102 are used by other elements of transition placement circuit 18 to determine the time at which a transition of the nBD signal, such as the active edge of the nBD signal, occurs and the timing offset between a transition of the reference clock, such as the rising edge of the reference clock, and the transition of the nBD signal. This timing offset represents a phase difference between the transitions of the reference clock and the nBD signal.

The outputs of storage device 102 are used by an embodiment of a phase measuring device, such as phase measuring device 104. Using the outputs provided by storage device 102, phase measuring device 104 determines when the active edge of the nBD signal occurs. In addition, phase measuring device 104 determines which output of delayed clocks circuit 100 corresponds most closely in time to the active edge of the nBD signal. In determining this output, phase measuring device 104 effectively measures the phase difference between the reference clock and the active edge of the nBD signal. This phase difference information is used in determining the placement of transitions that form the video data stream supplied to driver circuit 20. The output of phase measuring device 104 includes a binary encoded value specifying the number of the output of delayed clocks circuit 100 that provides a delayed version of the reference clock having a rising edge corresponding most closely in time to the active edge of the nBD signal. Because this binary encoded value specifies the number of the output of delayed clocks circuit 100 which corresponds to a fraction of a period of the reference clock, the binary encoded value corresponds to a phase difference. In addition, the output of phase measuring device 104 includes a beam detect pulse (bd_pulse) synchronized with the video clock. The beam detect pulse is used to determine the cycle of the video clock during which the active edge of the nBD signal occurs.

Phase measuring device 104 generates a beam detect pulse synchronized with a rising edge of the video clock indicating the occurrence of the active edge of the nBD signal. The beam detect pulse occurs a fixed number (fixed from scan line to scan line on a unit of media) of cycles of the video clock following the cycle of the video clock during which the active edge of the nBD signal occurs. This fixed number of cycles of the video clock is determined by hardware in transition placement circuit 18. However, it is very important that this fixed number is repeated from scan line to scan line on a unit of media to permit vertical alignment of scan lines on the media, thereby allowing for resolution of the fine detail of images. The beam detect pulse, synchronized with a rising edge of the video clock, is used as a timing reference for the supply of the pixel data to transition placement circuit 18 by rasterizer 16. Based upon the beam detect pulse, rasterizer 16 starts a left margin counter. When this counter reaches a predetermined value, rasterizer 16 begins sending pixel data synchronous with the video clock. The predetermined value is selected so that the pixel data byte corresponding to the left edge of the scan line generates the corresponding video data output from transition circuit 18 at the left edge of the first pixel in the scan line when pulsating beam 24 is at the left edge of the first pixel in the scan line. A certain number of video clock cycles are required to process the pixel data byte presented at the input to transition circuit 18 into the corresponding video data presented to the input of driver circuit 20. The predetermined value accounts for the number of video clock cycles used by transition placement circuit 18 to generate video data for a pixel corresponding to a pixel data byte, for the number of video clock cycles that occur between the active edge of the nBD signal and the time at which pulsating beam 24 is at the left edge of the first pixel in the scan line, and for the fixed number of video clock cycles between detection of the active edge of the nBD signal and the generation of the beam detect pulse.

The binary encoded values supplied by converter 106 specify the locations of transitions relative to rising edges of the reference clock. If the rising edge of the reference clock is synchronized with the active edge of the nBD signal (that is, a phase difference of zero) then the left edge of each pixel corresponds, in time, to a rising edge of the reference clock and the binary encoded values supplied by converter 106 specify the locations of the transitions within the pixel. However, there will very likely be a phase difference between these edges of the reference clock and the nBD signal. Furthermore, this phase difference will very likely be different on different scan lines. Therefore, to maintain the desired precision of alignment of the pixels between scan lines, transition placement circuit 18 will account for this phase difference on each scan line.

As previously mentioned, the output of phase measuring device 104 includes a binary encoded value specifying the number of the output of delayed clocks circuit 100 providing a delayed version of the reference clock having a rising edge corresponding most closely in time to the active edge of the nBD signal. If the active edge of the nBD signal and a rising edge of the reference clock occur, relative to each other, within one half of the time delay increment between the output of delayed clocks circuit 100 corresponding to the reference clock and the output of delayed clocks circuit 100 corresponding to the reference clock delayed by a first time delay increment of delayed clocks circuit 100, then the binary encoded output from phase measuring device 104 will correspond to the reference clock output. This situation could, for example, be represented by an output of a binary encoded value of zero from phase measuring device 104. If however, the active edge of the nBD signal is delayed from the rising edge of the reference clock more than one half of the time delay increment between the reference clock output of delayed clocks circuit 100 and the first time delay increment output of delayed clocks circuit 100, then the binary encoded value output from phase measuring device 104 will correspond to the delayed version of the reference clock having a rising edge closest in time to the active edge of the nBD signal. If, for example, the output of delayed clocks circuit 100 corresponding to five time delay increments from the reference clock had a rising edge closest in time to the active edge of the nBD signal, then the binary encoded value output from phase measuring device 104 could have a value of five.

The binary encoded value output from phase measuring device 104 indicates the phase difference between the rising edge of the reference clock and the active edge of the nBD signal. This time difference will most likely vary from scan line to scan line. To align the pixels on successive scan lines in the direction of rotation of photoconductor drum 28, the video data stream supplied to drive circuit 20 for a scan line is delayed in time (i.e. phase shifted) by a time substantially equal to the delay of the output of delayed clocks circuit 100 (from the reference clock) corresponding to the binary encoded value determined by phase measuring device 104. The term substantially equal, as used in this context, means equality within the sum of one half of the largest time increment between the outputs of delayed clocks circuit 100 and the other sources of timing error in transition placement circuit 18. By delaying the video data stream supplied to drive circuit 20 in this manner, compensation is achieved for variations in the timing of the active edge of the nBD signal relative to the reference clock.

To accomplish the shifting of the video data stream, the locations of the transitions specified in the binary encoded values supplied by converter 106 for each pixel of a scan line must all be shifted by a time substantially equal to the binary encoded value from phase measuring device 104. An embodiment of a transition adjustment device, such as transition adjustment circuit 107, adjusts the locations of the transitions specified by the binary encoded values output from converter 106 to compensate for the phase difference between a rising edge of the reference clock and the active edge of the nBD signal. This shifting of the transitions is accomplished in an embodiment of a transition shifting device included in transition adjustment circuit 107, transition adjuster 108, and an embodiment of a transition delay device for delaying transitions by a cycle of the reference clock, queue 110. Transition adjuster 108 receives the binary encoded values from converter 106 and phase measuring device 104. Using the binary encoded value from phase measuring device 104, transition adjuster 108 determines locations of the transitions relative to rising edges of the reference clock to account for the phase difference between a rising edge of the reference clock and the active edge of the nBD signal. This determination is performed for each transition in each cycle of the reference clock forming a scan line, so that all transitions in all cycles of the reference clock are shifted in time relative to the reference clock rising edge.

The phase difference between a rising edge of the reference clock and the rising edge of the nBD signal may be almost as large as a period of the reference clock. For this situation, the location of transitions specified by the binary encoded values from converter 106 during one period of the reference clock may be shifted to the succeeding period of the reference clock. Consider the case in which the phase difference is greater than half of a period of the reference clock and the binary encoded values from converter 106 specify the location of a transition in the right half of a cycle of the reference clock. For this case, the transitions in the right half of the current cycle must be shifted into the next cycle the correct amount to maintain the alignment between pixels on successive scan lines. Transition adjuster 108 and queue 110 accomplish the shifting of transitions across a boundary between successive cycles of the reference clock as determined by the phase difference measured with phase measuring device 104.

The binary encoded value supplied by phase measuring device 104 and the binary encoded values supplied by converter 106 are added in transition adjuster 108. The binary encoded value supplied by phase measuring device 104 represents the number of the output of delayed clocks circuit 100 providing a delayed version of the reference clock having a rising edge within one half of a delay time increment of the active edge of the nBD signal. The binary encoded values supplied by converter 106 represent the desired locations of transitions within a pixel relative to a rising edge of the reference clock. If the phase difference between a rising edge of the reference clock and the active edge of the nBD signal is zero for a scan line, then the binary encoded values supplied by converter 106 also represent the locations of the transitions relative to the left edges of pixels.

Each of the binary encoded values supplied by converter 106 is added to the binary encoded value supplied by phase measuring device 104 for a scan line. The sums of these binary encoded values represent the locations of transitions within a cycle of the reference clock accounting for the phase difference between the active edge of the nBD signal and a rising edge of the reference clock. By using these sums to specify transition locations, the resulting transitions will occur at times during each of the pixel time periods in a scan line necessary to generate transitions corresponding to the pulse shape and pulse width specified by the pixel data byte.

However, those sums having values that correspond to delays from a rising edge of the reference clock beyond the current cycle of the reference clock will not be placed within the current cycle of the reference clock. That is, the phase difference is sufficiently large and the locations of these transitions are sufficiently close to the end of the current cycle of the reference clock so that these transitions are shifted into the next cycle of the reference clock. It should be recognized that more than one transition may be shifted across the boundary between cycles of the reference clock. This could occur, if for example, converter 106 generated binary encoded values corresponding to the placement of more than one transition in the right half of the current cycle of the reference o clock and the phase difference was sufficiently large. Transition adjuster 108 compares these sums to the number of outputs of delayed clocks circuit 100. If any of these sums correspond to delays from a rising edge of the reference clock for the current cycle greater than or equal to a period of the reference clock (that is, greater the number of outputs of delayed clocks circuit 100), then the corresponding transitions will be shifted from the current cycle of the reference clock into the next cycle of the reference clock. If any of these sums correspond to delays from a rising edge of the reference clock for the current cycle less than a period of the reference clock, then the corresponding transitions will remain within the current cycle of the reference clock.

For those sums from transition adjuster 108 corresponding to delays exceeding a period of the reference clock, transition adjuster 108 reduces the sums by a value corresponding to one cycle of the reference clock so that those reduced sums specify the locations of transitions relative to a rising edge of a next cycle of the reference clock. The reduced sums are stored in queue 110. If all of the sums correspond to delays less than a cycle of the reference clock, then no transitions are shifted to the next cycle of the reference clock. Queue 110 delays the transition information it receives from the current cycle of the reference clock into the next cycle to accomplish the shifting of the transition or transitions between cycles of the reference clock. The output of queue 110 includes the sums received during the previous cycle of the reference clock.

An embodiment of transition generation logic, such as transition generation logic 111, is arranged to receive the outputs from transition adjustment circuit 107 and configured to generate video data from these outputs. The binary encoded values from transition adjustment circuit 107 specify the locations of transitions within the current cycle of the reference clock, with the binary encoded values from queue 110 having been delayed from the previous cycle of the reference clock into the current cycle of the reference clock. The video data includes the transitions that are to be supplied to driver circuit 20 necessary to create the desired pulse shapes at the desired pulse widths within the pixels. Transition generation logic 111 includes an embodiment of a transition data generator, such as transition data generator 112.

Transition data generator 112 receives the output from transition adjustment circuit 107 to generate transition data specifying the location of all the transitions in the current pixel relative to a rising edge of the reference clock. Transition data generator 112 includes a number of outputs equal to the number of outputs of delayed clocks circuit 100. Each of the outputs includes a bit that provides an instruction to generate a transition or to not generate a transition. The bits of the output from transition data generator 112 form a transition data value with the highest order bit corresponding to the end of the current cycle of the reference clock and the lowest order bit corresponding to the beginning of the current cycle of the reference clock.

Transition generation logic 111 also includes an embodiment of transition logic, transition logic 114. The outputs of transition data generator 112 are coupled to transition logic 114. Transition logic 114 generates the stream of video data supplied to driver circuit 20. The outputs of delayed clocks circuit 100 are coupled to transition logic 114. Transition logic 114 includes storage elements that are clocked using the outputs of delayed clocks circuit 100. As previously mentioned, the outputs of delayed clocks circuit 100 are the reference clock and delayed versions of the reference clock. The outputs of delayed clocks circuit 100 are coupled to the storage elements of transition logic 114 so that consecutive incrementally delayed versions of the reference clock are coupled to storage elements that can place transitions at consecutive times within a cycle of the reference clock from the beginning of the cycle until one delay increment before the end of the cycle. Each of the data inputs of the storage elements corresponds to one of the outputs from transition data generator 112. The correspondence is such that the reference clock output of delayed clocks circuit 100 is coupled to the storage element of transition logic 114 that is associated with a bit in the transition data value assigned to the beginning of a cycle of the reference clock and the output of delayed clocks circuit 100 corresponding to the most delayed version of the reference clock is coupled to the storage element of transition logic 114 that is associated with a bit in the transition data value assigned to be closest to the end of the cycle of the reference clock. The bits between those corresponding to the reference clock and the most delayed version of the reference clock are associated with those storage elements having the same relative order in the transition data value as do the delayed versions of the reference clock to which they correspond. That is successively delayed versions of the reference clock correspond to successively higher order bits of the transition data value.

If a particular bit in the output from transition data generator 112 is set to generate a transition in the output of transition logic 114, this bit will cause the loading of a bit value that generates this transition into the corresponding storage element of transition logic 114 on a transition of the output from delayed clocks circuit 100 that is coupled to that storage element. The output of the storage element will change states after the propagation delay of the storage element and cause a transition in the output of transition logic 114. Because the outputs of delayed clocks circuit 100 are successively delayed versions of the reference clock, the transition will occur at the desired time within the cycle of the reference clock. Higher order bits in the transition data value will similarly generate transitions at other times during the cycle of the reference clock. Therefore, by causing a change in the output of selected ones of the storage elements in transition logic 114, a transition or transitions can be placed at the desired time (within a resolution determined by the number of outputs of delayed clocks circuit 100) during the cycle of the reference clock and therefore within the pixel.

The following paragraphs will describe the operations of functional blocks within transition placement circuit 18. In providing this description, reference will be made to logic elements within the functional block. It should be recognized that these logic elements are symbolic representations of the actual hardware used within transition placement circuit 18. In the actual implementation of transition placement circuit 18, the hardware is synthesized from a hardware description language such as VHDL. The actual logic elements and their interconnections are determined by the program used to compile the VHDL code. However, the descriptions of the functional blocks provide sufficient information for one of ordinary skill in the art to generate VHDL code to implement the disclosed functions.

Shown in FIG. 3 is an embodiment of delayed clocks circuit 100 and an embodiment of storage device 102. The embodiment of delayed clocks circuit 100 shown in FIG. 3 includes 32 delay elements of which delay element 200 is representative. The reference clock is present at the d0 output. Delayed clocks circuit 100 is designed so that to generate 32 clocks with a substantially equal delay between each successive clock output. To accomplish this objective, delayed clocks circuit 100 is designed so that each of clock outputs d0–d31 is output from a delay element having a substantially equal input load as all other delay elements and each of clock outputs d0–d31 drives substantially the same output load. Designing delayed clocks circuit 32 in this manner will reduce variations in the delay of each of clock outputs d0–d31 from the ideal.

In this embodiment of delayed clocks circuit 100, the delay contributed by each of the delay elements are substantially equal and the cumulative delay of the 31 delay elements substantially equals $31/32$ of a period of the reference clock. It should be recognized that although this embodiment of delayed clocks circuit 100 is constructed to have 32 outputs, depending upon the implementation of the transition placement circuit with which it was used, a greater or lesser number of delay elements may be used. Also, the delay contributed by each of the delay elements need not be substantially equal if this is taken into account in the transition placement circuit. For example, if it were desired to have the capability to locate transitions within a greater resolution within cycles of the reference clock than a greater number of delay elements would be used, with each of the delay elements contributing a substantially equal fraction of the period of the reference clock. As the desired resolution increases or decreases, the number of bits necessary to represent the locations of transitions within cycles of the reference clock may have to increase or decrease.

A wide variety of types of delay elements could be used in delayed clocks circuit 100. The delay elements could be implemented using analog components or digital components. In addition, each of the delay elements could have a programmable delay. An important characteristic of delayed clocks circuit 100 is that it provides 32 clocks having substantially equal delays over a cycle of the reference clock. In the disclosed embodiment of delayed clocks circuit 100, the delay provided by each of the delay elements is approximately 1 ns. An example of delay elements having an adjustable delay is disclosed in U.S. patent application having USPTO Ser. No. 09/293,520, incorporated by reference in its entirety into this specification. In this patent application, the disclosed delay elements have delays adjustable with approximately a 100 pico second adjustment resolution.

In delayed clocks circuit 100, the reference clock is generated from the video clock. The buffering of the video clock that occurs prior to delay element 202 is represented by clock tree buffer 204. In FIG. 3, delay element 202 is included so that each of the outputs of delayed clock circuit 100 has substantially identical loads. However, it should be recognized that, alternatively, delay element 202 may be eliminated and the d0 output may be taken from the output of clock tree buffer 204. As previously mentioned, implementations of transition placement circuit 18 in which the reference clock frequency is a multiple or a fraction of the frequency of the video clock are possible. For these implementations, additional hardware would generate the higher or lower frequency reference clock from the video clock.

The embodiment of storage device 102 shown in FIG. 3 includes 32 storage elements, such as rising edge triggered D type flip flops, of which storage element 206 is representative. However, it should be recognized that alternative embodiments of transition placement circuit 18 could be designed to allow a resolution for the placement of transitions either higher or lower than $1/32$ of a reference clock period. In addition, it should be recognized that other types of storage elements could be used in this embodiment of storage device 102. A purpose of storage device 102 is to capture transitions of the nBD signal. Because some of the storage elements included in storage device 102 may sample the nBD signal during a transition, these storage elements are more susceptible to entering a metastable state. Although certain aspects of phase measuring device 104, to be described in greater detail later, reduce the impact of a metastable state on one or more of the storage elements, the performance of storage device 102 may be improved by using metastable resistant storage elements. Typically, each type of semiconductor fabrication process provides the option of fabricating particular logic elements in a metastable resistant version.

The clock input of each of the 32 storage elements is coupled, in succession, to the outputs of the embodiment of delayed clocks circuit 100. Each of the data inputs is coupled to the nBD signal. Each of the storage elements used in storage device 102 latches the signal at its input on the rising edge of the delayed clocks circuit output coupled to that storage element. In this fashion, storage device 102 samples the nBD signal at 32 instances over a cycle of the reference clock. This sampling is performed continuously by storage device 102. This sampling of the nBD signal is performed at a high rate relative to the period of time during which the nBD signal is at a high logic level.

When the inactive edge (rising edge) of the nBD signal occurs, this transition is captured in storage device 102. Assuming no metastability problems in the storage elements of storage device 102, the storage element having the first high logic level (after the time at which the nBD signal is at a low logic level) is the best estimate of the timing (relative to the rising edge of the reference clock) of the inactive edge of the nBD signal. Similarly, the storage element having the first low logic level (after the time at which the nBD signal is at a high logic level) is the best estimate of the timing of the active edge of the nBD signal. Detection of the inactive edge of is used to initialize phase measuring device 104. The phase difference between the rising edge of the reference clock and the active edge of the nBD signal is used to shift the video data for the scan line corresponding to the detected active edge.

Metastability problems can occur when the storage elements are clocked by the outputs of delayed clocks circuit 100 while the data inputs (the nBD signal) of the storage elements are greater than the maximum low logic level and less than the minimum high logic level. This can occur on either the inactive or active edge of the nBD signal. Metastability problems in the storage elements of storage device 102 can cause the outputs of the storage elements to oscillate between the high and low logic levels or cause the outputs of the storage elements to exist in a state between the minimum valid high logic level and the maximum valid low logic level. Metastability can make it difficult for phase measurement device 104 to reliably measure the phase difference between the rising edge of the reference clock and the active edge of the nBD signal.

Shown in FIG. 4 is a simplified block diagram of phase measuring device 104. Phase measuring device 104 includes a configuration to condition the values received from the outputs of storage device 102 to dramatically reduce the likelihood that metastable states on any of these outputs adversely affects the digital value supplied by phase measuring device 104. The 32 outputs of the 32 storage elements included in storage device 102 are coupled to first metastable filter register 300. The 32 outputs of first metastable filtering register 300 are coupled to the inputs of second metastable filtering register 302. And, the 32 outputs of second register 302 are coupled to the inputs of freeze register 304. Each of first metastable filtering register 300, second metastable filtering register 302, and freeze register 304 are clocked by the video clock. In passing the outputs of the storage elements through the three registers following storage device 102, it is extremely likely that any metastability states present on the outputs of any of the storage elements in storage device 102 will not occur on the corresponding output of freeze register 304. To illustrate how these three cascaded registers reduce the likelihood that a metastable state on the outputs of one or more of the storage elements in storage device 102 will exist on the outputs of freeze register 304, consider the case in which the output of one of the storage elements in storage device 102 oscillates or is at an intermediate value because of metastability. In passing this output through three registers, it is extremely likely that in at least one of these registers the signal will be at a valid logic level (not in a metastable state) when it is latched by the register on the rising edge of the video clock. Therefore, the three cascaded registers operate to substantially reduce the likelihood of a meta-stable state on the outputs of freeze register 304.

Synchronizer pulse generator 301 monitors the nBD signal to detect the occurrence of the inactive edge. Synchronizer pulse generator 301 includes 3 flip flop stages to reduce the likelihood of metastability. Synchronizer pulse generator 301 generates a pulse, synchronous with the video clock and one cycle of the video clock in length, indicating detection of the inactive edge. The timing of this pulse relative to the inactive edge is not critical because the precise timing of the inactive edge is not critical. Prior to the occurrence of the inactive edge (rising edge) of the nBD signal, all the outputs of storage device 102 are at a low logic level. After the inactive edge of the nBD signal occurs, some of the outputs will be at a high logic level. The pulse generated by synchronizer pulse generator 301 is coupled to inactive edge logic 306. Upon detecting this pulse, inactive edge logic 306 asserts a reset signal to first metastable filtering register 300, second metastable filter register 302, freeze register 304 and phase and cycle logic 308. The reset operation places the storage elements of these registers at a high logic level. In addition, this reset operation resets phase and cycle logic 308 so that it de-asserts the freeze signal to freeze register 304 (that is, freeze register 304 is set to a non-frozen state). This allows freeze register 304 to load outputs from second metastable filter register on the rising edges of the video clock.

Prior to the occurrence of the active edge of the nBD signal and after the detection of the inactive edge of the nBD signal, all of the storage elements in first metastability filtering register 300, second metastability filtering register 302, and freeze register 304 are at a logic high level. The storage elements of storage device 102, after the reference clock cycle during which the active edge of the nBD signal occurs, have at least one storage element with an output at a low logic level. After the 32 outputs of storage device 102 for this sample of the nBD signal pass through first metastability filtering register 300 and second meta-stability filtering register 302, and are loaded into freeze register 304 on successive rising edges of the video clock, the 32 outputs of freeze register 304 are presented to phase and cycle logic 308. Phase and cycle logic 308 determines whether there is at least one output of freeze register 304 having a low logic level. If at least one low logic level is detected, phase and cycle logic 308 outputs the beam detect pulse synchronous on a rising edge of the video clock (after, as previously mentioned, a fixed number of cycles of the video clock) and asserts a freeze signal coupled to freeze register 304, thereby preventing any additional samples of the nBD signal from loading into freeze register 304.

In addition to generating the beam detect pulse, phase and cycle logic 308 determines the output of delayed clocks circuit 100 having a rising edge occurring most closely in time to the active edge of the nBD signal during the cycle of the reference clock in which the active edge occurred. To accomplish this, active edge logic 308 successively compares each of the 32 outputs of freeze register 304, beginning with the output corresponding to the reference clock output of delayed clocks circuit 100, to the next highest bit to determine if there has been a change in state of the nBD signal. The output of freeze register 304 first having a low logic level is considered to correspond to the output of delayed clocks circuit 100 having a rising edge closest in time to the active edge of the nBD signal during the cycle of the reference clock in which the active edge occurs. Phase and cycle logic 308 generates a 5 bit number (to represent one of the 32 outputs of freeze register 304) specifying the number of the first output of freeze register 304 having a low logic level. For example, the output of freeze register 304 corresponding to the reference clock output of delayed clocks circuit 100 is bit number 0 of freeze register 304. The output of freeze register 304 corresponding to the output of delayed clocks circuit 100 having a delay of $^{31}/_{32}$ of a reference clock cycle from the rising edge of the reference clock is bit number 31 of freeze register 304. Because this number represents the output of delayed clocks circuit 100 having a rising edge occurring closest in time to the active edge of the nBD signal during the cycle of the reference clock in which the active edge occurs, the number is a measurement of the phase difference between the rising edge of the reference clock and the active edge of the nBD signal. Phase and cycle logic 308 generates the 5 bit number synchronous with the rising edge of the video clock on the same cycle of the video clock during which the beam detect pulse is generated.

Shown in FIG. 4A is an implementation of a scheme to generate the binary encoded value representing the phase difference. The 32 storage elements of freeze register 304 (labeled from 0 to 31) are supplied to XOR block 310. XOR block 310 includes a series of 2 input XOR gates connected in a chain. The output of storage element 0 goes into a first XOR gate included in block 310. A low logic level is coupled to the other input of this first XOR gate. The output of the first XOR gate and the output of storage element 1 go into a second XOR gate included in XOR block 310. The output of this second XOR gate, along with the output of storage element 2, are coupled to the inputs of a third XOR gate. The output of this third XOR gate, along with the output of storage element 3, are coupled to the inputs of a fourth XOR gate. This pattern is continued for all 32 storage elements of freeze register 304. The outputs of all the XOR gates in first XOR block 310 are coupled to the inputs of 2 input XOR gates in second XOR block 312 in the same fashion. This same pattern is used in third XOR block 314, fourth XOR block 318 and fifth XOR block 320. For each of the XOR blocks, the output of the XOR gate at the end of the chain is coupled to an input of register 322. The output of register 322 will correspond to the binary encoded number of storage element of freeze register having the first low logic level (going from storage element 0 to 31).

It is very important that the 5 bit number generated by phase and cycle logic 308 is matched to the correct cycle of the reference clock. For example, assume that the $^{31}/_{32}$ delay output of delayed clocks circuit 100 occurs closest in time to the active edge of the nBD signal, but the beam detect pulse indicated that the active edge occurred on the succeeding cycle of the nBD signal. For this case, the video data would be shifted almost one cycle of the reference clock more than it should be to adjust for the phase difference. This error could noticeably degrade the image because of the shifting of the pixels on the scan line containing the phase error relative to other scan lines.

Shown in FIG. 5 is a simplified functional block diagram of converter 106. A pixel data byte is supplied to the input of converter 106 synchronous with the rising edge of the video clock. Each pixel data byte defines the pulse shape and pulse width for the corresponding pixel. The term "pulse width" refers to the total fraction (realizing that non-contiguous portions within a single pixel can be exposed) of the pixel in the direction pulsating beam 26 is swept which is to be exposed by pulsating beam 26. The term "pulse shape" refers to the relative positioning of the exposed regions within the pixel. For example, this particular implementation permits a left justified pulse, a right justified pulse, a center justified pulse or a split justified pulse. Although four pulse shapes are permitted in this particular implementation, it should be recognized that with a different number of bits used a larger or smaller number of pulse shapes could be defined. For a larger number of possible pulse shapes, more bits would be required to define the desired pulse shape.

The pulse shape and pulse width are encoded in the pixel data byte. The two highest order bits of the pixel data byte are used to specify generation of one of four pulse shapes. The left justified pulse is defined by two transitions in the pixel. The first transition is located at the left edge of the pixel and the second transition is located within the pixel at a position determined from the lower order six bits. The center justified pulse is defined by two transitions within the pixel. The locations of the transitions are determined from the lower order six bits. The right justified pulse is defined by two transitions in the pixel. The first transition is located within the pixel at a location determined from the lower order six bits. The second transition is located at the right edge of the pixel. The split justified pulse is defined by four transitions in the pixel. One transition is located on the left edge of the pixel and one transition is located on the right edge of the pixel. The remaining two transitions are located within the pixel at locations determined from the lower order six bits. Six bits are required to specify the locations of the transitions because of the need to locate transitions at the right edge of a pixel which requires a value of 32 (100000).

The five most significant bits of the lower order six bits are used to specify the pulse width (with resolution to $^1/_{32}$ of a pixel width). In this implementation, the least significant bit of the lower order six bits is ignored by converter 106. However, using all six bits could provide a resolution of $^1/_{64}$ of a pixel width. With all six lower order bits set to a low logic level, the pulse width is zero, corresponding to a white pixel (no exposure within the pixel) With all lower order six bits set to a logic high level, the pulse width is equal to the pixel width, corresponding to a black dot (total exposure within the pixel). With the lower order six bits having values between these extremes, converter 106 generates transitions within the pixel.

Input register 400 loads the pixel data byte on the rising edge of the video clock. Converter logic 402 receives the pixel data byte from register 400 and generates 4 six bit codes using the pixel data byte. The logic included in converter logic 402 maps the value of the pixel data byte to the 4 six bit codes so that the necessary transitions are generated in the pixel corresponding to the specified pulse shape having the specified pulse width. The four six bit codes generated by converter logic 400 are loaded, respectively, into output registers 404–410 on the rising edge of the video clock so that they are available for loading into transition adjuster 108 on the next rising edge of the video clock. For those pulse shapes for which there are only two transitions located in the pixel, the values of those codes not used to specify the location of transitions does not matter. These codes correspond to "don't care" values from converter logic 402. In addition to generating the 4 six bit codes, converter logic 402 generates 4 valid code bits VC0–VC3, one associated with each of the 4 six bit codes. Although the valid code bits VC0–VC3 are depicted as included in output register 404–410 to indicate their purpose, they are actually handled separately in the hardware. Each of the 4 valid code bits VC0–VC3 signifies whether the corresponding output register contains a code that represents a valid transition within that cycle of the reference clock that corresponds to the pixel data byte used to generate the codes. The 4 valid code bits VC0–VC3 are used by other parts of transition placement circuit 18 to determine whether values represent valid transitions.

The four six bit codes specify the locations of the transitions, relative to a rising edge of the reference clock, within a cycle of the reference clock in terms of a value that represents the number of $^1/_{32}$'s of a cycle of the reference clock. For example, on a split justified pulse, output register 404 includes a code having a value of 0, specifying a transition at the left edge of the cycle corresponding to the rising edge of the left part of the split justified pulse, output register 406 includes a code having a value specifying a transition within the cycle corresponding to the falling edge of the left part of the split justified pulse, output register 408 includes a code having a value specifying a transition within the cycle corresponding to the rising edge of the right part of the split justified pulse, and output register 410 includes a code having a value of 32 specifying a transition at the right edge of the cycle corresponding to the falling edge of the right part of the split justified pulse. The codes for the other pulse shapes specify the locations of transitions similarly.

Shown in FIG. 6 is a simplified functional block diagram of transition adjuster 108. Transition adjuster 108 performs the function of time shifting the transitions specified by the 4 six bit codes by an amount specified by the phase difference determined by phase measuring circuit 104. On the rising edge of the video clock the 4 six bit codes, and the valid code bits VC0–VC3 are loaded, respectively, into code registers 500–506 and a register for storing the valid code bits VC0–VC3. The 4 six bit outputs of code registers 500–506 are presented, respectively, to adders 508–514. The 5 bit number generated by phase measuring device 104 is present at an input of each of adders 508–514 for the entire scan line. Each of adders 508–514 adds the 5 bit value representing the phase difference to each of the 4 six bit codes from code registers 500–506.

For each of adders 508–514, if the sum of the code value and the phase difference exceeds 31, then a carry output is generated. The carry outputs for adders 508–514 are designated, respectively, as C0–C3. When a carry output is generated from an addition of a code value to a phase difference, this indicates that the transition represented by that converter code (assuming it is a valid transition) is to be delayed one cycle of the reference clock. Each of the outputs of adders 508–514 include 5 bits, with each of the outputs specifying a transition location in terms of a number of 1/32's of a cycle of the reference clock. At this stage, the adjusted code values at the outputs of adders 508–514 are represented by only the 5 lower order bits of the six bit result because the highest bit is used for one of carry bits C0–C3 to determine whether the addition of the phase difference will delay the transition one cycle of the reference clock. The outputs of each of adders 508–514 are loaded into the respective queue registers 516–522, to which adders 508–514 are coupled, on the rising edge of the video clock. The outputs of each of adders 508–514 are available at the outputs of queue registers 516–522 on the rising edge of the next cycle of the video clock.

Transition adjuster 108 performs the adjustment of transition positions using the phase difference provided from phase measuring device 104. The operations of transition adjuster 108 include, as necessary, delaying the transition positions by one cycle of the reference clock. Selection logic 524 includes a configuration to control the generation of the adjusted code values to account for the phase difference between the active edge of the nBD signal and the rising edge of the reference clock. Selection logic 524 is arranged to receive as inputs the valid code bits VC0–VC3 associated with the 4 six bit codes generated by converter 106 and the carry bits generated from the addition of the phase difference to each of the converter codes.

If the carry bit is asserted and the corresponding valid code bit is asserted, this indicates that the transition corresponding to this code will be delayed by a cycle of the reference clock. If this is the case, selection logic 524 will set the corresponding valid queue bit to an asserted state to indicate that this queue register contains a value representing a valid transition. If however, a valid code bit is not asserted, this indicates that the code stored in the code register does not represent a transition. If this is the case, selection logic 524 will set the corresponding valid queue bit to a not asserted state to indicate that this queue register does not contain a value corresponding to a valid transition. If the carry bit is not asserted, this indicates that the corresponding queue register does not contain a value corresponding to a valid transition and selection logic 524 will set the corresponding valid queue bit to a not asserted state. In this manner, selection logic 524 determines for each of queue registers 516–522 whether the contents correspond to a valid transition that must be delayed by a cycle of the reference clock.

If the carry bit from any of adders 508–514 is not asserted but the corresponding valid code bit is asserted, this indicates that the output of the corresponding adder is a value representing a valid transition corresponding to the current cycle of the reference clock. However, if the valid code bit is not asserted and the corresponding carry bit is not asserted, this indicates that the corresponding adder output does not represent a valid transition.

Block 526 represents connections between the outputs of adders 508–514, queue registers 516–522, and multiplexers 528–536. Between the outputs of adders 508–514 and the outputs of queue registers 516–522 there are 8 outputs. Each of these 8 outputs are an input to each of multiplexers 528–536. Because of the complexity involved in showing each connection, the routing of the 8 outputs to each of multiplexers 528–536 is represented by block 526.

On each rising edge of the video clock, transition adjuster 108 determines the locations of the transitions corresponding to that cycle of the reference clock. This involves selecting the valid transition values from queue registers 516–522 and from the outputs of adders 508–514 to provide them to transition generation logic 111. To perform this function, selection logic 524 generates the select values S0–S4 and a multiplexer valid bit for each of multiplexers 528–536. Selection logic 524 executes a process in which, starting with multiplexer 528, it finds, if there are any, one of the 8 input values that corresponds to a valid transition. This is done by selection logic 524 using the 4 valid code bits VC0–VC3, the 4 valid queue bits VQ0–VQ3, and the 4 carry bits C0–C3. If any of the valid queue bits VQ0–VQ3 are asserted, this indicates that the corresponding queue register contains a valid transition value. If any of the carry bits C0–C3 are not asserted and any of the corresponding valid code bits VC0–VC3 are asserted, this indicates that the output of the corresponding adder is a valid transition value. When selection logic 524 finds one of the 8 inputs having a valid transition value, it generates the corresponding select value S0 to select this input. In addition, selection logic 524 sets the corresponding valid multiplexer bit VM0 to an asserted state. The valid multiplexer bits are used to indicate that the output of the corresponding multiplexer contains a valid transition value.

After performing this process on the inputs of multiplexer 528, selection logic 524 then performs a similar process on the inputs of multiplexer 530. However, when this process is performed on the inputs of multiplexer 530, the input of multiplexer 530, corresponding to the selected input on multiplexer 528, is not examined to determine whether it has a valid transition value. Rather, the remaining inputs are examined to find one having a valid transition value. When this next input having a valid transition value is found, selection logic 524 generates the select value S1 to select this input and sets the corresponding valid multiplexer bit VM1 to an asserted state. This process is repeated for multiplexer 532, excluding from selection the two inputs previously found to have valid transition values. The process continues until it is determined that all of the valid transition values have been selected or until the process is completed for multiplexer 536. It should be emphasized that this selection process may start and end with any input and any multiplexer. The important characteristic of the selection process is that each of the valid transition values is selected by one multiplexer.

The selection process performed by selection logic 524 is completed during a single cycle of the video clock. After completion of this selection process, the valid transition values (if any) are present at the outputs of multiplexers 528–536 and those multiplexers having valid transition values have corresponding asserted valid multiplexer bits. If no valid transition values are found during this selection process each of the valid multiplexer bits for multiplexers 528–536 will be set to a not asserted state indicating that there are no transitions corresponding to the current cycle of the video clock.

In this implementation of transition adjuster 108, 5 multiplexers are used because, with 4 possible pulse shapes, there may be up to 5 transitions occurring within a pixel. The situation in which there may be 5 transitions occurring within a pixel occurs when the pixel data specifies a right justified pulse, having a certain range of widths, followed by a split justified pulse having a certain range of widths, and with the phase difference existing within a certain range. A right justified pulse includes two transitions. A split justified pulse includes 4 transitions. With a right justified pulse followed by a split justified pulse, the falling edge transition of the right justified pulse will occur at the same time as the rising edge of the left portion of the split justified pulse. These overlapping transitions will be specified by two equal valid transition values among the 8 inputs to multiplexers 528. Within the certain range of phase differences, the rising edge of the right justified pulse, the falling edge of the right justified pulse, the rising edge of the left portion of the split justified pulse, the falling edge of the left portion of the split justified pluses, and the rising edge of the right portion of the split justified pulse can occur within a single pixel, thereby generating 5 transitions within a single pixel. It should be recognized that if there were a different number of possible pulse shapes, a different maximum number of transitions within a pixel may be possible. The number of multiplexers used will equal the maximum possible number of transitions within a pixel.

Shown in FIG. 7 are several waveforms that illustrate the operation of transition placement circuit 18 in generating a transition during a pixel time period. Reference clock 600 is generated in the delayed clocks generator 100. The nBD signal 602 is generated before each scan line from the illumination of an optical detector by pulsating beam 24. Inactive edge 603 occurs when the nBD signal changes state from a low logic level to a high logic level. Phase measuring device 104 determines a time interval 604 (the phase difference) starting with a rising edge 607 of reference clock 600 and ending with detection of nBD signal 602 changing out of a high logic level 606 (during the active edge 605 of nBD signal 602). Included in FIG. 7 is a hypothetical video data stream 608. Hypothetical video data stream 608 is the video data stream that would have been generated by transition placement circuit 18 had there been no need to shift the transition locations generated by converter 106 by the phase difference between rising edge 607 of reference clock 600 and active edge 605 of nBD signal 602. It should be emphasized that hypothetical video stream 608 is shown only for the purpose of illustrating how transition placement circuit 18 shifts the transition locations provided by converter 106, that is, hypothetical video data stream 608 is not actually generated in the example shown in FIG. 7.

However, video data stream 610 is the video data stream that is generated by transition placement circuit 18 in the example shown in FIG. 7. Video data stream 610 shows the timing of the video data output from transition placement circuit 18 that results because of the operation of transition placement circuit 18. As can be seen in FIG. 7, video data stream 610 is shifted in time (relative to hypothetical video data stream 608) by an amount of time substantially equal to time interval 604. The effect of the operation of transition placement circuit 18 is to generate video data stream 610 so that the pulse shape at the pulse width specified by the pixel data byte for each pixel is aligned with the left edge of the pixel time period (of which first pixel time period 612 is representative) independent of the value of time interval 604 between rising edge 607 of reference clock 600 and detection of a change of nBD signal 602 out of a high logic level. This will ensure that all pixels of all the scan lines maintain their proper vertical alignment on the media.

To more clearly illustrate operation of transition placement circuit 18, FIGS. 7A–7B show an expanded scale of the dotted regions shown in FIG. 7. The shifting of transitions occurs as follows. Consider transition 614 in hypothetical video data stream 608 (note, that transition 614 within hypothetical data stream 608 is not actually generated in the example of FIG. 7 while transition 614 within video data stream 610 is generated in the example of FIG. 7). Transition 614 is located at a first position with respect to a rising edge 616 of reference clock 600. First position 618 is determined by the pulse width and pulse shape specified in the corresponding pixel data byte and in the corresponding output from converter 106. The shifting of video data stream 610 by a time substantially equal to time interval 604 shifts first position 618 of transition 614 in hypothetical video data stream 608 to second position 620 within second pixel time period 622. As can be seen from FIG. 7 and FIG. 7B, time interval 604 is sufficiently large to shift transition 614 from first position 618 to second position 620 (relative to rising edge 616) between successive cycles of reference clock 600. The position of transition 614 in time is specified by transition placement circuit 18 as occurring a time interval 624 after a rising edge 626 of reference clock 600.

Shown in FIG. 8 is a simplified block diagram of transition data generator 112. Transition data generator 112 loads the outputs from multiplexers 528–536, into input registers 700–708 on the rising edge of the video clock. In addition, valid multiplexer bits VM0–VM4 are loaded into transition generation logic 710 on the rising edge of the video clock. Using the valid multiplexer bits, transition generation logic 710 determines which of input registers 700–708 (if any) contain valid transition values. Transition generation logic 710 also generates a 32 bit transition data value using the contents of input registers 700–708 which have been identified as containing valid transition values. In this 32 bit transition data value, each bit at a high logic level indicates that a transition will be placed in the corresponding cycle of the reference clock at a location corresponding to the position of the bit at the high logic level within the transition data value. If the valid multiplexer bits VM0–VM4 indicate that there are no valid transition values in any of input registers 700–708, then none of the 32 bits of the transition data value will be set at a high logic level. The 32 bit transition data value is stored in output register 712.

Shown in FIG. 9 is a simplified block diagram of transition logic 114. Transition logic 114 uses the transition data value stored in output register 712 to produce video data. Transition vector generator 800 generates a 32 bit transition vector that defines the position of transitions (if any) within the current cycle of the reference clock. A bit of the transition vector at a high logic level causes the generation of a transition during the current cycle of the reference clock at a time substantially equal to the occurrence of a rising edge of the corresponding output of delayed clocks circuit 100. Transition vector generator 800 uses video clock and an inverted video clock to ensure that the set hold times for all the storage elements, to which bits of the transition vector are supplied, are met. However, implementations of a transition vector generator using a single clock could also be used. An example of a possible implementation of transition logic 114 is disclosed in copending patent application having serial number having USPTO Ser. No. 09/293,520 incorporated by reference herein. Another example of a possible implementation of transition logic 114 is disclosed in copending patent application having, incorporated by reference herein. Yet another example of a possible implementation of transition logic 114 is disclosed in U.S. Pat. NO. 5,990,923, incorporated by reference herein.

Transition logic 114 also includes storage elements, of which storage element 802 is exemplary. Storage element 802 could include, for example, an edge triggered storage element such as a rising edge triggered D flip flop. The clock inputs of each of the storage elements are coupled to one of the outputs of delayed clocks circuit 100. The ordering of these connections is such that each of the 32 bits of the transition vector are coupled to storage elements having an output of delayed clocks circuit 100 coupled to it that corresponds in time to the position in the current cycle of the reference clock represented by that bit of the transition vector. For example, the lowest order bit of the transition vector is coupled to the storage element having the reference clock coupled to its clock input and the highest order bit of transition vector is coupled to the storage element having the most delayed version of the reference clock (delayed by $^{31}\!/_{32}$ of a reference clock cycle) coupled to it.

Transition logic 114 includes logic 804 configured to generate a high logic level when an odd number of high logic levels are present at its inputs and configured to generate a low logic level when an even number of high logic levels are present at its inputs. Any transition on an input of logic 804 generates a transition at its output. The output of logic 804 supplies the stream of video data to the input of driver circuit 20.

Shown in FIG. 10 is an implementation of logic 804. In this implementation, logic 804 includes cascaded XOR gates. For a transition data value that includes 32 bits, 16 two input XOR gates would be used in the first stage of the cascaded XOR gates. The implementation of logic 804 shown in FIG. 9 controls the variations in propagation delay between different paths transitions can take within logic 804. For example, it is possible to have transitions that occur on different branches of XOR gates that propagate through different XOR gates to cause a transition in the output. These propagation delay differences result in error in the placement of transitions during the pixel time period. In addition differences in XOR gate transition times from a high level to low level and from a low level to a high level result in error in the placement of transitions during the pixel time period. To reduce this source of error in the placement of transitions, the XOR gates shown in FIG. 9 are constructed to have closely matched propagation times and closely matched low to high and high to low transition times. One implementation of logic 804 has achieved variations in transitions from any input to the output of no more than 100 pico seconds.

It should be recognized that other logic configurations may be used to implement logic 804. The important functional aspect is the ability to generate a transition out the output of the transition logic for any transition at the input of the logic. If a high level of precision is desired in the placement of the transition for these other logic configurations, consideration must be given to the differences in propagation delays of different paths that logic level transitions may take.

Transition logic 114 accomplishes the placement of transitions within the current cycle of the reference clock as follows. Those bits of the 32 bit transition vector at a high logic level specify that there is to be a transition at the location within the current cycle of the reference clock corresponding to the position of the bit at the high logic level within the 32 bits of the transition vector. The 32 bits of the of the transition data value are presented to the inputs of transition vector generator on the rising edge of the reference clock. Transition vector generator generates the transition vector using the transition data value. The transition vector is presented to the input of storage element 802 and its associated storage elements. On the rising edges of the outputs of delayed clocks circuit 100, the values present at the inputs of these storage elements are clocked through to the respective outputs of these storage elements. As the outputs of these storage elements change over the current cycle of the reference clock, logic 804 will generate transitions over the pixel time period at times within the current cycle of the reference clock corresponding to the transition data value.

Shown in FIG. 11 is a high level flow diagram of a method for generating a first transition of a first signal, in an imaging device, within a first time interval. First, step 900 determines a second time interval beginning with a second transition of a second signal and ending with detecting a third signal changing out of a first state. Next, step 902 shifts a predetermined position in time of the first transition with respect to a third transition of the second signal by the second time interval to determine a position in time of the first transition. Finally, step 904 generates the first transition of the first signal at the position.

Shown in FIG. 12 is a high level flow diagram of a method for adjusting a position in time of a transition of a signal relative to a reference clock. First, step 1000 measures a first time interval between a first rising edge of the reference clock and a change in state of a phase reference signal. Next, step 1002 shifts the position of the transition relative to a second rising edge of the reference clock by the first time interval forming an adjusted position in time. Finally, step 1004 generates the transition at the adjusted position.

Although several embodiments of the invention have been illustrated, and their forms described, it is readily apparent to those of ordinary skill in the art that various modifications may be made to these embodiments without departing from the spirit of the invention or from the scope of the appended claims.

What is claimed is:

1. A method for generating a first transition of a first signal in an imaging device, within a first time interval, comprising:

determining a second time interval beginning with a second transition of a second signal and ending with detecting a third signal changing out of a first state;

shifting a predetermined position in time of the first transition with respect to a third transition of the second signal by the second time interval to determine a position in time of the first transition; and generating the first transition of the first signal at the position.

2. The method as recited in claim 1, wherein:

determining the second time interval includes sampling the third signal at a plurality of instances to generate a plurality of samples and determining an ending of the second time interval as a one of the plurality of samples earliest in time different from the first state.

3. The method as recited in claim 2, wherein:

shifting the predetermined position includes adding the second time interval to the predetermined position to determine the position.

4. The method as recited in claim 3, wherein:

generating the first transition at the position includes determining whether a first cycle of the second signal includes the first transition or a second cycle of the second signal includes the first transition.

5. The method as recited in claim 4, wherein:

the first signal includes a video data signal for controlling a light source;

the imaging device includes an electrophotographic imaging device:

the first time interval includes a pixel time period;

the second signal includes a reference clock;

the second transition includes a first rising edge;

the third signal includes a beam detect signal;
the first state includes a high logic level; and
the third transition includes a second rising edge.

6. The method as recited in claim 5, wherein:
generating the first transition includes generating a first transition data value including a bit specifying the position of the first transition by a location of the bit in the first transition data value.

7. The method as recited in claim 6, wherein:
generating the first transition includes storing the bit in a storage element at a time corresponding to the position of the first transition in the pixel time period.

8. The method as recited in claim 7, wherein:
generating the first transition includes supplying the bit from the storage element to logic having a plurality of inputs to generate the first transition.

9. In an imaging device, a transition placement device to generate a first transition of a first signal in a first time interval using a first value, comprising:
a phase measuring device configured to determine a second value using a second time interval beginning with a second transition of a second signal and ending with detection of a change of a third signal out of a first state;
a transition adjustment device configured to determine a third value, representing a position in time of the first transition relative to a third transition of the second signal, using the first value and the second value; and
transition generation logic configured to generate the first transition at the position using the third value.

10. The transition placement device as recited in claim 9, further comprising:
a storage device including a plurality of storage elements configured to sample the third signal at a plurality of instances to generate a plurality of sampled values.

11. The transition placement device as recited in claim 10, wherein:
the phase measuring device includes a configuration to determine the second value using the plurality of sampled values.

12. The transition placement device as recited in claim 11, wherein:
the first signal includes a video data signal used to control a light source;
the imaging device includes an electrophotographic imaging device;
the first time interval includes a pixel time period;
the second signal includes a reference clock;
the second transition includes a first rising edge;
the third signal includes a beam detect signal;
the first state includes a high logic level; and
the third transition includes a second rising edge.

13. The transition placement device as recited in claim 12, further comprising:
a converter configured to generate the first value from a predetermined value specifying a predetermined position of the first transition relative to the second rising edge of the reference clock.

14. The transition placement device as recited in claim 13, wherein:
the transition generation logic includes a transition data generator configured to generate a first transition data value using the third value, with the first transition data value including a plurality of bits and with the position of the first transition determined by a location of a one of the plurality of bits in the first transition data value.

15. The transition placement device as recited in claim 14, wherein:
the transition adjustment device includes a configuration to determine, using the third value, whether the first transition will occur during a first cycle of the reference clock corresponding to the second rising edge of the reference clock or in a second cycle of the reference clock beginning at an end of the first cycle and with the transition adjustment device configured to generate a fourth value specifying the position of the first transition relative to a third rising edge of the reference clock if the first transition will occur in the second cycle.

16. The transition placement device as recited in claim 15, wherein:
the transition adjustment device includes a transition delay device arranged to receive the fourth value and configured to provide the fourth value to the transition generation logic to generate the first transition in the second cycle.

17. The transition placement device as recited in claim 16, further comprising:
a delayed clocks generator to generate a plurality of signals, with each of the plurality of signals formed by delaying the reference clock.

18. The transition placement device as recited in claim 17, wherein:
the transition generation logic includes a plurality of storage elements, with each of the plurality of storage elements arranged to receive one of the plurality of bits in the first transition data value and with a clock input of each of the plurality of storage elements coupled to one of the reference clock and the plurality of signals where each of plurality of storage elements outputs one of the plurality of bits on a transition of the clock input.

19. An electrophotographic imaging device for forming an image using data, comprising:
a photoconductor;
a rasterizer configured to generate pixel data corresponding to a pixel time period using the data;
a circuit configured to generate a position in time of a first transition of a video data signal relative to a second transition of a reference clock using the pixel data; and
a transition placement device including a phase measuring device configured to determine a first time interval between a third transition of the reference clock and a state change of a beam detect signal, a transition adjustment device configured to generate an adjusted position in time relative to the second transition of the reference clock using the first time interval and the position, and transition generation logic configured to generate the first transition in the pixel time period using the adjusted transition position; and
a photoconductor exposure system configured to expose the photoconductor to light according to the first transition.

20. The electrophotographic imaging device as recited in claim 19, wherein:
the phase measuring device includes a storage device including a plurality of storage elements configured to sample the beam detect signal at a plurality of instances to generate a plurality of sampled values.

21. The electrophotographic imaging device as recited in claim 20, further comprising:

a delayed clocks circuit to generate the reference clock and a plurality of delayed reference clocks with each of the reference clock and the plurality of delayed reference clocks coupled to one of the storage elements.

22. The electrophotographic imaging device as recited in claim 21, wherein:

the phase measuring device includes a configuration to determine the state change of the beam detect signal using the plurality of sampled values; and the transition generation logic includes a transition data generator configured to generate a first transition data value using the adjusted position, with the first transition data value including a plurality of bits and with the position of the first transition relative to the second transition of the reference clock determined by a location of a one of the plurality of bits in the first transition data value.

23. The electrophotographic imaging device as recited in claim 22, wherein:

the transition adjustment device includes a transition shifting device to generate the adjusted position relative to a fourth transition of the reference clock occurring after the second transition of the reference clock if the first transition will occur at least one period of the reference clock after the second transition of the reference clock; and the transition adjustment device includes a transition delay device arranged to receive the adjusted position relative to the fourth transition of the reference clock and configured to delay receipt by the transition data generator of the adjusted position relative to the fourth transition of the reference clock one period of the reference clock.

24. In an imaging device, a method for adjusting a position in time of a transition of a signal relative to a reference clock, comprising:

measuring a first time interval between a first rising edge of the reference clock and a change in state of a phase reference signal;

shifting the position of the transition relative to a second rising edge of the reference clock by the first time interval forming an adjusted position in time; and generating the transition at the adjusted position.

25. The method as recited in claim 24, wherein:

shifting the position of the transition includes determining if the first time interval equals or exceeds a time of a cycle of the reference clock; and forming the adjusted position includes determining a second time interval substantially equal to a difference between the first time interval and the time of the cycle of the reference clock and specifying the adjusted position relative to a third rising edge of the reference clock using the difference.

26. The method as recited in claim 25, wherein:

generating the transition at the adjusted position includes generating the transition at the adjusted position relative to the third rising edge using the difference.

27. The method as recited in claim 26, wherein:

the imaging device includes an electrophotographic imaging device.

28. The method as recited in claim 27, wherein:

the phase reference signal includes a beam detect signal.

* * * * *